(12) United States Patent
Seto

(10) Patent No.: US 8,859,121 B2
(45) Date of Patent: Oct. 14, 2014

(54) BATTERY MODULE, AND ELECTRICITY STORAGE DEVICE

(75) Inventor: Sadashi Seto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 315 days.

(21) Appl. No.: 13/269,797

(22) Filed: Oct. 10, 2011

(65) Prior Publication Data

US 2012/0094157 A1 Apr. 19, 2012

(30) Foreign Application Priority Data

Oct. 13, 2010 (JP) ................................ 2010-230322

(51) Int. Cl.
*H01M 2/10* (2006.01)
*H01M 2/12* (2006.01)

(52) U.S. Cl.
CPC *H01M 2/10* (2013.01); *H01M 2/12* (2013.01); Y02E 60/12 (2013.01)
USPC ........................................... 429/82; 429/163

(58) Field of Classification Search
USPC .................... 429/82, 164, 166, 167
See application file for complete search history.

(56) References Cited

U.S. PATENT DOCUMENTS

| | | | |
|---|---|---|---|
| 6,278,259 B1 | 8/2001 | Kimoto et al. | |
| 8,518,568 B2 * | 8/2013 | Dougherty et al. ............. | 429/71 |
| 2009/0181288 A1 | 7/2009 | Sato | |
| 2009/0202897 A1 | 8/2009 | Kim et al. | |
| 2010/0052692 A1 | 3/2010 | Yano et al. | |
| 2010/0116570 A1 | 5/2010 | Sugawara et al. | |
| 2010/0248008 A1 | 9/2010 | Sugawara et al. | |
| 2011/0027632 A1 | 2/2011 | Higashino et al. | |
| 2011/0117401 A1 | 5/2011 | Lee et al. | |

FOREIGN PATENT DOCUMENTS

| | | |
|---|---|---|
| JP | 2001-110377 A | 4/2001 |
| JP | 2006-185894 A | 7/2006 |
| JP | 2006-244981 A | 9/2006 |
| JP | 2007-27011 A | 2/2007 |
| JP | 2009-123701 A | 6/2009 |
| JP | 2009-164085 A | 7/2009 |
| JP | 2009-277647 A | 11/2009 |
| JP | 2010-56035 A | 3/2010 |
| JP | 2010-108788 A | 5/2010 |
| JP | 2010-113999 A | 5/2010 |

(Continued)

OTHER PUBLICATIONS

Explanation of Circumstances Concerning Accelerated Examination with English Translation submitted to the Japanese Patent office on Dec. 27, 2012 (eleven (11) pages).

*Primary Examiner* — Mark F Huff
*Assistant Examiner* — Monique Wills
(74) *Attorney, Agent, or Firm* — Crowell & Moring LLP

(57) ABSTRACT

An electricity storage device according to the present invention includes a battery module having side plates and cover members assembled to both the sides of a case member of the battery module, so that gas discharge spaces are defined into which gas is emitted from the terminals of battery cells that are stored within the case member. Projecting portions are provided to the side plates respectively, and have through-holes communicating with the gas discharge spaces. The lowermost surfaces of the through-holes of the projecting portions are positioned lower than a axe of any of the battery cells. The projecting portions are connected by a tubular rubber members.

10 Claims, 21 Drawing Sheets

(56) References Cited

FOREIGN PATENT DOCUMENTS

| | | | |
|---|---|---|---|
| JP | 2010-238609 A | 10/2010 |
| JP | 2011-70871 A | 4/2011 |
| JP | 2011-108653 A | 6/2011 |

* cited by examiner

BATTERY MODULE, AND ELECTRICITY STORAGE DEVICE

INCORPORATION BY REFERENCE

The disclosure of the following priority application is herein incorporated by reference: Japanese Patent Application No. 2010-230322, filed Oct. 13, 2010.

BACKGROUND OF THE INVENTION

1. Field of the Invention

The present invention relates to a battery module that includes a plurality of cells, and to an electricity storage device.

2. Description of Related Art

A battery module that is mounted as a power supply device to an electric automobile or the like is built as a combination of a large number of secondary cells, such as, for example, lithium ion battery cells, nickel-hydrogen battery cells, nickel-cadmium battery cells, or the like. Sometimes, with such a secondary cell, it may happen that the battery cell becomes damaged due to shock or vibration or the like, or that the internal pressure in the battery cell may rise and a gas including liquid in mist form containing electrolyte may leak out from the interior of the battery cell. Since there is a fear that this type of gas may ignite, it is necessary to vent it to the exterior of the battery module.

The following construction is per se known as such a gas discharge construction. A gas venting conduit is arranged above and in parallel with the plurality of battery cells and extends along the direction of arrangement of the battery cells, and through-holes are provided in this gas venting conduit correspondingly to the battery cells. A safety valve is provided to each of the battery cells, having a valve body made from rubber, a valve lid blocking this valve opening and communicating with the interior of the casing, and a tubular venting aperture above the valve lid, and having an conically shaped projecting portion at the upper external periphery of this venting aperture. And the valve opening of each of the battery cells is communicated with the gas venting conduit by the conically shaped projecting portion of this safety valve being fitted into an through-hole in the gas venting conduit (for example, refer to Japanese Laid-Open Patent Publication 2001-110377).

SUMMARY OF THE INVENTION

Since, with the device disclosed in Japanese Laid-Open Patent Publication 2001-110377, a safety valve of a complicated construction is provided to each of the battery cells, and since moreover a construction is employed in which each of the conically shaped projecting portions needs to be fitted into a through-hole of the gas venting conduit individually, accordingly the ease of working for assembling this device is poor. Moreover, since the gas venting conduit is arranged above the battery cells and in parallel with them, accordingly the discharge of gas is not smooth, and there is a fear that the gas may stagnate upon the gas discharge path.

According to the 1st aspect of the present invention, a battery module comprises: a case member having a storage section in which a plurality of battery cells each having a positive electrode terminal and a negative electrode terminal are arranged along a longitudinal direction in at least one layer with their axes parallel, and made so that its one side and its other side facing the terminals of the plurality of battery cells are open surfaces opened to the exterior; a first side plate that covers an open surface on one side of the case member, and that has a plurality of opening portions that expose the terminals of the plurality of battery cells on the one side of the case member; a second side plate that covers an open surface on the other side of the case member, and that has a plurality of opening portions that expose the terminals of the plurality of battery cells on the other side of the case member; a first cover member that covers the first side plate and defines a first gas discharge space between itself and the first side plate, into which gas flows out from the terminals of the plurality of battery cells on the one side of the case member via the opening portions of the first side plate; a second cover member that covers the second side plate and defines a second gas discharge space between itself and the second side plate, into which gas flows out from the terminals of the plurality of battery cells on the other side of the case member via the opening portion of the second side plate; a first guide portion having a through-hole communicating with the first gas discharge space; a second guide portion having a through-hole that communicating with the second gas discharge space; and a guide portion communication member including a flexible member that connects the first guide portion and the second guide portion; and wherein the through-hole communicating with the first gas discharge space and the through-hole communicating with the second gas discharge space have respectively a lowermost surface that is positioned lower than a axe of any of the plurality of battery cells that are arranged in the case member.

According to the 2nd aspect of the present invention, in a battery module according to the 1st aspect, it is preferred that the first guide portion protrudes from the first side plate towards the second side plate, and the second guide portion protrudes from the second side plate towards the first side plate; both the first guide portion and the second guide portion have hollow cylinder shapes.

According to the 3rd aspect of the present invention, in a battery module according to the 1st or 2nd aspect, it is preferred that the plurality of battery cells that are arranged in the longitudinal direction in the storage section of the case member are arranged in several layers; a lowermost plurality of battery cells that are arranged in a lowermost layer are displaced by half a pitch along the longitudinal direction relative to a battery cells that are arranged in a layer directly above the lowermost layer; correspondingly, one end portion of the lowermost plurality of battery cells is positioned at a recessed position to interior space relative to one end portion of a plurality of battery cells that are arranged in a layer above the lowermost layer; the case member has a recessed portion corresponding to the recessed position of the lowermost plurality of battery cells; and the first guide portion, the second guide portion and the guide portion communication member are arranged in the hollow portion.

According to the 4th aspect of the present invention, in a battery module according to any one of the 1st through 3rd aspects, it is preferred that the first guide portion and the second guide portion have tapered tip end portions.

According to the 5th aspect of the present invention, in a battery module according to any one of the 1st through 4th aspects, it is preferred that the guide portion communication member includes a tubular rubber member that communicates with the first guide portion and the second guide portion.

According to the 6th aspect of the present invention, in a battery module according to the 5th aspect, it is preferred that the tubular rubber member has bellows portions at both its end portions.

According to the 7th aspect of the present invention, in a battery module according to the 5th or 6th aspect, it is preferred that the tubular rubber member has an opening portion between the bellows portions at both end portions of the tubular rubber member, and the guide portion communication member includes a pipe shaped coupling that is fitted into the opening portion of the tubular rubber member.

According to the 8th aspect of the present invention, in a battery module according to the 7th aspect, it is preferred that the guide portion communication member has a letter-L shaped tubular rubber member that is connected to the coupling, and the letter-L shaped tubular rubber member has a large diameter portion having high rigidity and a small diameter portion.

According to the 9th aspect of the present invention, in a battery module according to any one of the 1st through 8th aspects, it is preferred that the first guide portion and the second guide portion are formed integrally with the first side plate and the second side plate respectively.

According to the 10th aspect of the present invention, an electricity storage device comprises: a first battery module constituted by a battery module according to the 1st aspect; a second battery module constituted by a battery module according to the 1st aspect; and an external communication member that communicates together the guide portion communication member of the first battery module and the guide portion communication member of the second battery module.

According to the 11th aspect of the present invention, in an electricity storage device according to the 10th aspect, it is preferred that the external communication member includes: a first pipe shaped coupling that communicates with the guide portion communication member of the first battery module, a second pipe shaped coupling that communicates with the guide portion communication member of the second battery module, and a linking tubular rubber member that connects the first pipe shaped coupling and the second pipe shaped coupling.

According to the 12th aspect of the present invention, in an electricity storage device according to the 11th aspect, it is preferred that the first side plate and the second side plate in each of the first battery module and the second battery module have engagement portions that engage the linking tubular rubber member.

According to the 13th aspect of the present invention, in an electricity storage device according to the 11th or 12th aspect, it is preferred that the external communication member further includes a third pipe shaped coupling that is connected to the second pipe shaped coupling.

According to the 14th aspect of the present invention, in an electricity storage device according to the 13th aspect, it is preferred that the second pipe shaped coupling is a letter-T shaped communication member having three end portions for communication that are connected to the guide portion communication member of the second battery module, the linking tubular rubber member, and the third pipe shaped coupling.

According to the 15th aspect of the present invention, in an electricity storage device according to the 13th or 14th aspect, it is preferred that the first pipe shaped coupling is a letter-L shaped communication member having two end portions for communication that are connected to the guide portion communication member of the first battery module and an end portion for communication that is connected to the linking tubular rubber member, and in which a side opposite to the end portion for communication that is connected to the linking tubular rubber member is blocked up.

DESCRIPTION OF THE PREFERRED EMBODIMENTS

Embodiment 1

In the following, a battery module and an electricity storage device according to an embodiment of the present invention will be explained in detail with reference to the drawings. And, in the following, by way of example, a case will be explained in which the battery module according to this embodiment is applied to an electricity storage device that is included in an in-vehicle power supply device for an electrically operated vehicle, and in particular for an electric automobile. The term "electric automobile" should be understood to include both a hybrid electric automobile that includes an engine that is an internal combustion engine and an electric motor as sources of driving power for the vehicle, and also a pure electric automobile in which an electric motor is the one and only source of driving power for the vehicle, and so on.

Figure 1:
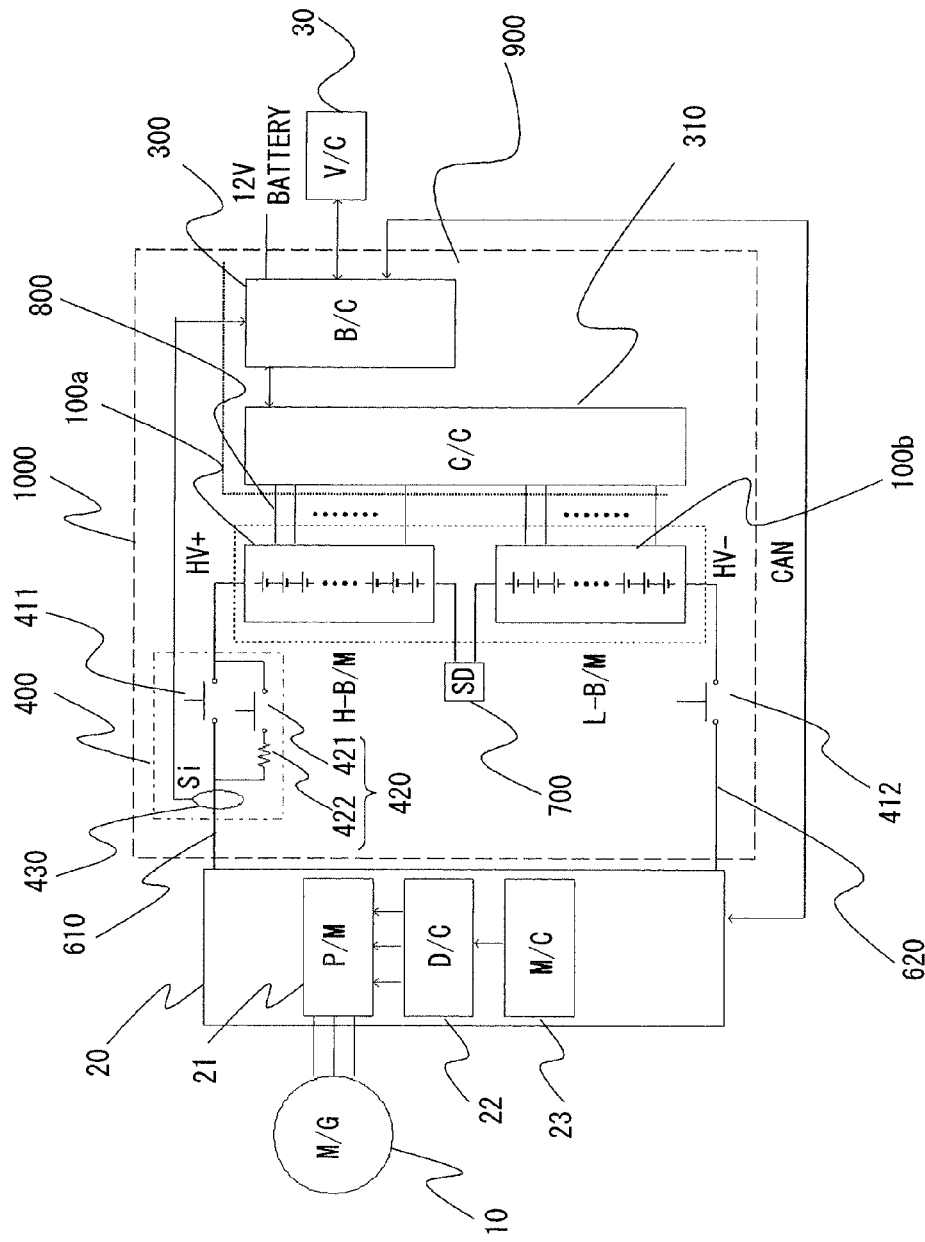
FIG. 1 is a block diagram of an embodiment, showing the structure of an in-vehicle electromechanical system that employs an electricity storage device of the present invention.

First, the structure of an in-vehicle electrical system (a drive system for an electric motor) that uses a battery module according to an embodiment of the present invention will be explained with reference to FIG. 1.

This in-vehicle electrical system includes a motor-generator 10, an inverter device 20, a vehicle controller that performs overall control of the vehicle, and an electricity storage device 1000 that constitutes an in-vehicle power supply device. This electricity storage device 1000 may, for example, be a lithium ion battery device that includes a plurality of battery cells.

The motor-generator 10 is a three phase AC synchronous machine. In an operating mode in which rotational power is required, such as during driving of the vehicle or when the engine is to be started or the like, this motor-generator 10 operates as a motor and supplies the generated rotational power to a body that is to be driven, such as the vehicle wheels or the engine or the like. In this case, DC power from the electricity storage device 1000 is converted into three phase AC power by the inverter device 20, that is an electrical power conversion device, and is supplied to the motor-generator 10.

Moreover, in an operating mode in which it is necessary to generate electricity, such as during regeneration when the vehicle is decelerating or during braking or the like, when it is necessary to charge up the electricity storage device 1000 and so on, the motor-generator 10 is rotationally driven by drive force from the vehicle wheels or from the engine, and functions as a generator to generate three phase AC power. In this case, the three phase AC from the motor-generator 10 is converted into DC power by the inverter device 20, and is supplied to the electricity storage device 1000. Due to this, electrical power is stored in the electricity storage device 1000.

The inverter device 20 is a device including electronic circuitry that performs power conversion as described above by the operation of semiconductor switching elements (to go ON and OFF), in other words that performs conversion from DC power to three phase AC power, and that performs conversion from three phase AC power to DC power. This inverter device 20 includes a power module 21, a drive circuit 22, and a motor controller 23.

The power module 21 is a power conversion circuit that includes six semiconductor switching elements, and that performs the power conversion described above by the operation of these semiconductor switching elements (to go ON and OFF).

In the power module 21, a DC positive side module terminal (not shown) is electrically connected to a DC positive side external terminal (not shown), and a DC negative side module terminal (not shown) is electrically connected to a DC negative side external terminal (not shown). The DC positive side external terminal and the DC negative side external terminal are power supply side terminals for transferring DC power to and from the electricity storage device 1000, and high voltage DC power supply cables 610 (on the positive side) and 620 (on the negative side) that extend from the electricity storage device 1000 are electrically connected to these DC external terminals. And AC side module terminals are electrically connected to AC side external terminals. These AC side external terminals are load side terminals for transferring three phase AC power to and from the motor-generator 10, and a three phase AC cable that extends from the motor generator 10 is electrically connected to these AC side external terminals.

The motor controller 23 is a device including electronic circuitry for controlling the switching operation of the six semiconductor switching elements included in the power conversion circuit. On the basis of a torque command outputted from a upper control device that performs overall control of the vehicle, for example from a vehicle controller 30, this motor controller 23 generates switching operation command signals for the six semiconductor switching elements (for example PWM (Pulse Width Modulation) signals). These command signals that have been generated are outputted to the driver circuit 22.

The electricity storage device 1000 includes battery modules 100a and 100b for storing and releasing electrical energy (i.e. for being charged and discharged with DC power), and a control device 900 for managing and controlling the states of these battery modules 100a and 100b. The battery modules 100a and 100b consist of a high potential side battery module 100a and a low potential side battery module 100b, electrically connected in series. A plurality of lithium ion battery cells (hereinafter termed "battery cells") connected in series are housed in each of the battery modules 100a and 100b. The plurality of battery cells and the connecting elements that connect these battery cells in series constitute an assembled battery. The structure of the battery modules 100a and 100b will be described in detail hereinafter.

An SD (service disconnect) switch 700 is provided between the negative side of the high potential side battery module 100a and the positive side of the low potential side battery module 100b. This SD switch 700 is a safety device that is provided in order to ensure security when maintaining and inspecting the electricity storage device 1000, and consists of an electrical circuit in which a switch and a fuse are electrically connected in series, and is operated by service personnel during maintenance and inspection.

The control device 900 includes the battery controller (B/C) 300 as an upper controller and the cell controller (C/C) 310 as a lower controller of the battery controller 300.

Along with managing and controlling the state of the electricity storage device 1000, the battery controller 300 also transmits information of the state of the electricity storage device 1000 and of charging and discharging control commands such as permitted charging and discharging power and so on, to the vehicle controller 30 or the motor controller 23, that is an upper control device. This management and control of the state of the electricity storage device 1000 includes measurement of the voltage and current of the electricity storage device 1000, calculation of the state of electricity storage of the electricity storage device 1000 (SOC: State Of Charge) and of its state of deterioration (SOH: State Of Health) and so on, measurement of the temperatures of the battery modules 100a and 100b, output of commands to the cell controller 310 (for example, commands for measuring the voltages of the battery cells, commands for adjusting the amounts of electricity stored in the battery cells, and the like), and so on.

The cell controller 310 is a lower controller than the battery controller 300, and performs management and control of the states of the plurality of battery cells according to commands from the battery controller 300 and consists of a plurality of integrated circuits (ICs). This management and control of the states of the plurality of battery cells includes measurement of the voltage of each cell, adjustment of variations of the amount of electricity stored in each cell, and so on. In other words, the cell controller 310 includes voltage measurement circuit that measures the voltage of each of the battery cells, although this feature is not shown in the figure. Each of the integrated circuits is allocated to a plurality of battery cells that correspond thereto, and performs management and control of the states of that corresponding plurality of battery cells.

The voltage between the terminals of the entire corresponding plurality of battery cells is used as the power supply for the integrated circuits included in the cell controller 310. The cell controller 310 and the battery modules 100a and 100b are electrically connected together via harnesses (connecting wiring) 800 in which a plurality of voltage detection lines that connect the positive and negative terminals of the lithium ion cells to the integrated circuits are bundled together. The highest potential voltage of the corresponding plurality of battery cells is used as a power supply by each of the integrated circuits, and is inputted via this harness (connection wiring) 800.

The positive terminal of the high potential side battery module 100a and the DC positive side external terminal of the inverter device 20 are electrically connected together via the positive side high voltage DC power supply cable 610. And the negative terminal of the low potential side battery module 100b and the DC negative side external terminal of the inverter device 20 are electrically connected together via the negative side high voltage DC power supply cable 620.

A junction box 400 is provided partway along the positive side high voltage DC power supply cable 610, and a negative side main relay 412 is provided partway along the negative side high voltage DC power supply cable 620. A relay mechanism that includes a positive side main relay 411 and a pre-charge circuit 420 is housed in the interior of the junction box 400. This relay mechanism is a switching unit for providing either electrical continuity or electrical interception between the battery modules 100a and 100b and the inverter device 20, and provides continuity between the battery modules 100a and 100b and the inverter device 20 when the vehicle is being powered, while cutting off connection between the battery modules 100a and 100b and the inverter device 20 when the vehicle is stopped and during abnormality of the vehicle, such as abnormality of the motor-generator 10 or of the inverter device 20. It is possible to ensure high security for the vehicle by controlling the connection between the electricity storage device 1000 and the inverter device with a relay mechanism in this manner.

The operation of this relay mechanism is controlled by the motor controller 23. When the vehicle is being started, upon receipt from the battery controller 300 of a notification of completion of starting of the electricity storage device 1000, the motor controller 23 operates the relay mechanism by outputting a command signal for continuity to the relay mechanism, and thereby provides electrical continuity between the battery modules 100a and 100b and the inverter device 20. Further, upon receipt of an OFF output signal from the ignition key switch when the vehicle is stopped, or upon receipt of an anomaly signal from the vehicle controller when an abnormality of the vehicle has occurred, the motor controller 23 operates the relay mechanism by outputting a command signal for interception to the relay mechanism, and thereby cuts off the electrical connection between the battery modules 100a and 100b and the inverter device 20.

The main relay is made up of a positive side main relay 411 and a negative side main relay 412. The positive side main relay 411 is provided partway along the positive side high voltage DC power supply cable 610, and controls the electrical connection between the positive side of the electricity storage device 1000 and the positive side of the inverter device 20. And the negative side main relay 412 is provided partway along the negative side high voltage DC power supply cable 620, and controls the electrical connection between the negative side of the electricity storage device 1000 and the negative side of the inverter device 20.

The pre-charge circuit 420 is a series circuit in which a pre-charge relay 421 and a resistor 422 are electrically connected in series, and is electrically connected in parallel with the positive side main relay 411.

When the in-vehicle electro-mechanical system is to be started, first, the negative side main relay 412 is turned on, and subsequently the pre-charge relay 421 is turned on. Due to this, a smoothing capacitor that is provided to the inverter is charged up in a state in which the flow rate of current supplied from the electricity storage device 1000 is limited by the resistor 422. After the smoothing capacitor has been charged up to a predetermined voltage, the positive side main relay 411 is turned on, and the pre-charge relay 421 is opened. Due to this, main current is supplied from the electricity storage device 1000 via the positive side main relay 411.

Furthermore, a current sensor 430 is housed in the interior of the junction box 400. This current sensor 430 is provided in order to detect the current that is being supplied from the electricity storage device 1000 to the inverter device 20. The output line of the current sensor 430 is electrically connected to the battery controller 300. The battery controller 300 detects the current that is being supplied from the electricity storage device 1000 to the inverter device 20 on the basis of the signal outputted from the current sensor 430. This current detection information is transmitted from the battery controller 300 to the motor controller 23 and/or the vehicle controller 30 and so on.

The current sensor 430 may be installed exterior to the junction box 400. The location at which the current of the electricity storage device 1000 is detected need not be the inverter device 20 side of the positive side main relay 411; it could also alternatively be the battery module 100a, 100b side of the positive side main relay 411.

It should be understood that it would also be acceptable to provide the voltage sensor (not shown in the figures) for detecting the voltage of the electricity storage device 1000 between the positive side high voltage DC power supply cable 610 and the negative side high voltage DC power supply cable 620. The battery controller 300 detects the overall voltage of the electricity storage device 1000 on the basis of the output signal from this voltage sensor. This voltage detection information is transmitted to the motor controller 23 and/or to the vehicle controller 30. The location where the voltage of the electricity storage device 1000 is detected may be on the battery module 100a, 100b side of the relay mechanism, or on its inverter device 20 side.

Next, the construction of the battery modules 100a and 100b will be explained. The battery module 100a and the battery module 100b both have fundamentally the same construction, and this will be described in detail hereinafter; however, both of them taken as a pair in combination constitute the electricity storage device. The installed guiding units for emitted gas are only partially different between the battery modules 100a and 100b. In the explanation given above, it was supposed that the battery module 100a was the high potential side and the battery module 100b was the low potential side. However, constructionally, these guiding units for emitted gas could be installed either to the high potential side or to the low potential side; it does not matter which.

Due to this, in the following explanation, simply a battery module 100 will be described. This battery module 100 may be applied either as the high potential side or as the low potential side.

Figure 2:
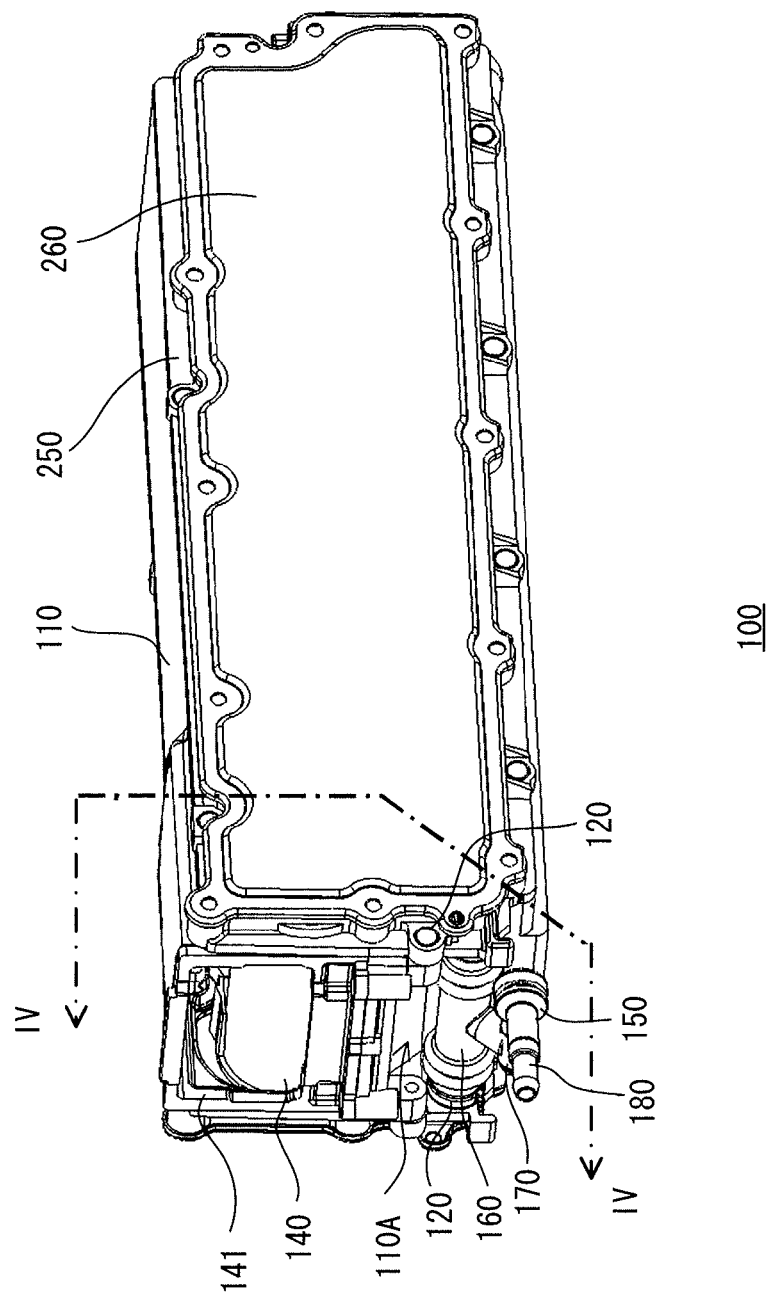
FIG. 2 is a perspective view showing the external appearance of a first embodiment of the battery module of the present invention.
Figure 3:
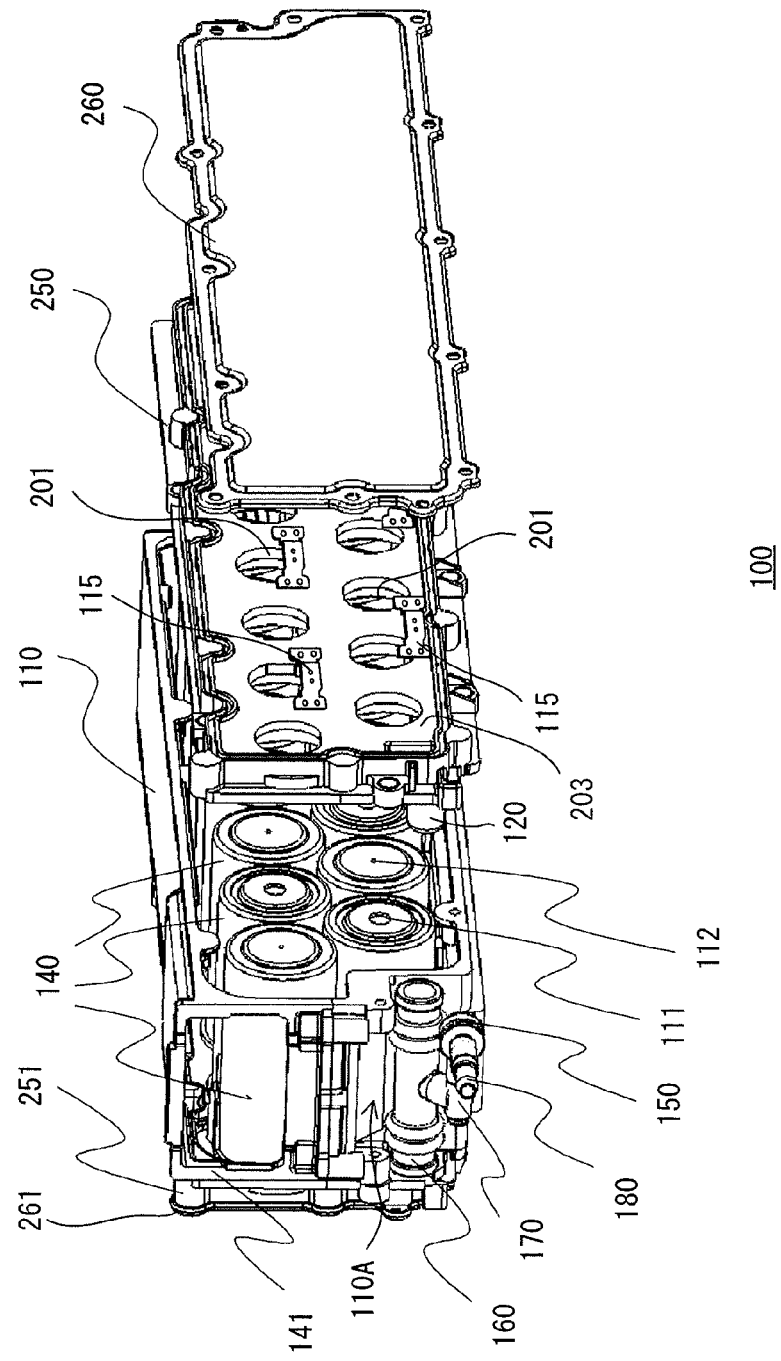
FIG. 3 is a perspective view of the battery module shown in FIG. 2, where the battery module is partially exploded.
Figure 4:
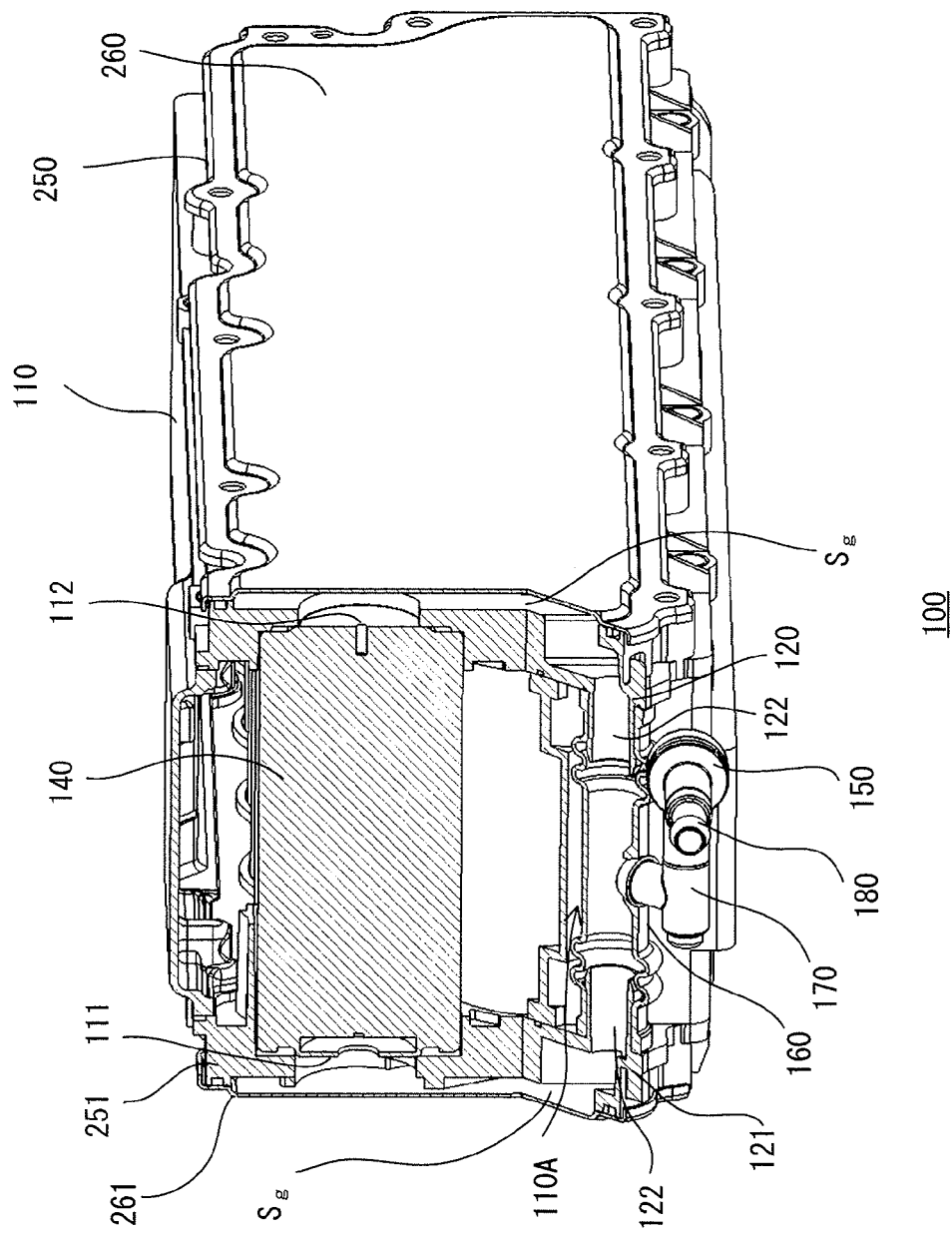
FIG. 4 is a sectional view taken along lines IV-IV in FIG. 2.

FIG. 2 is an external perspective view showing the outer appearance of a battery module that is a first embodiment of the present invention, FIG. 3 is a perspective view of the battery module shown in FIG. 2, where the battery module 100 is partially exploded, and FIG. 4 is a sectional view taken along lines IV-IV in FIG. 2.

The battery module 100 includes a case member 110, a pair of side plates 250 and 251 disposed on both sides of the case member 110, and cover members 260 and 261 disposed outside these side plates 250 and 251. The case member 110 is made as a casing block of approximately rectangular parallelepiped shape. The internal space within the case member 110 serves as a storage chamber (storage section) in which a plurality of cylindrical battery cells 140 are housed, and also serves to provide cooling passages through which a cooling medium (i.e. cooling air) flows for cooling these battery cells 140.

The two side surfaces of the case member 110 in its longitudinal direction are made as open surfaces that are open to the exterior. Within the case member 110, the cylindrical battery cells 140 that have positive terminals 111 and negative terminals 112 are arranged in parallel with one another along the longitudinal direction of the case member 110, with their positive terminals 111 or negative terminals 112 facing towards its open surfaces. The battery cells 140 are arranged in two layers, an upper layer and a lower layer, with their positive terminals 111 and negative terminals 112 pointing alternately in opposite directions. The battery cells 140 on the lower layer are arranged so as to be displaced with respect to the battery cells 140 in the upper layer, in the longitudinal direction, by half of the pitch between the battery cells 140. To put this in another manner, the battery cells 140 in the lower layer are positioned so that, in side view, their central axes lie at intermediate positions with respect to the battery cells 140 that are arranged in the upper layer. With this construction, the total height dimension of the battery cells 140 arranged in two layers in this manner is minimized.

Furthermore, since the battery cells 140 in the lower layer are arranged so as to be displaced by half a pitch with respect to the battery cells 140 in the upper layer, accordingly the end portion at one end of the battery cells 140 in the lower layer falls short of the end portion at that end of the battery cells 140 in the upper layer by half a pitch. A recessed portion 110A is formed on the case member 110 to correspond to this portion. A cooling air draft inlet 141 is formed on the upper portion of the case member 110 corresponding to this recessed portion 110A. And a cooling air draft outlet (not shown in the drawings) is formed on the opposite side of the recessed portion 110A of the case member 110. Although this feature is not shown in the drawings, a cooling air draft that is forcibly blown in by a blower fan is flowed within the case member 110 from the cooling air draft inlet 141, and is discharged from the cooling air draft outlet after having circulated around the peripheries of the battery cells 140. Due to this, the battery cells 140 are cooled, since their temperatures become elevated due to charging and discharging.

The side plates 250 and 251 are arranged so as to face one another in the short direction of the case member 110. Each of these side plates 250 and 251 is shaped as an almost flat plate member, and they are formed from a resin such as PBT or the like that is electrically insulating. The side plates 250 and 251 are fixed to the case member 110 by engagement means such as bolts, screws, rivets or the like with the interposition of sealing members, although none of these means are shown in the figure. Each of the side plates 250 and 251 is formed so that its edge portion is thicker than its main portion 203, and the upper surface of its main portion 203 is lowered from the upper surface of its peripheral portion. A large number of through holes 201 are formed in the main portions 203 of the side plates 250 and 251. The positive terminals 111 and the negative terminals 112 of the battery cells 140 are exposed via these through holes 201.

So called cover members 260 and 261, i.e. side covers, are provided on the outsides of the side plates 250 and 251, in other words on the opposite sides thereof to the storage chamber in which the battery cells 140 are held. These cover members 260 and 261 are respectively fixed to the side plates 250 and 251 by engagement members such as bolts or rivets or the like (not shown in the drawings).

The cover plates 260 and 261 are flat plates produced from metallic plates of iron, aluminum, or the like by press forming, and each of them has almost the same planar shape as that of its respectively corresponding side plate 250 and 251. The cover plates 260 and 261 are attached to the side plates 250 and 251 by their peripheral portions being laid over and fixed to the peripheral portions of the side plates 250 and 251. Moreover, the surfaces of the cover plates 260 and 261 inside their peripheral portions are bulged outwards in the directions opposite to the main portions of the side plates 250 and 251, in other words they are bulged outwards as plates towards the exterior of the case member 110. Due to this, spaces are created between the cover plates 260, 261 and the side plates 250, 251. These spaces, which are separated from the cooling passage for the cooling medium flow, function as gas discharge spaces Sg (refer to FIG. 4) to which gas including liquid in mist form is released from the battery cells 140.

The plurality of battery cells 140, along with being stored in layers in the storage chamber that is defined in the interior of the case member 110, also are sandwiched between the side plates 250 and 251 in the short side direction, and are electrically connected in series by being joined together by a plurality of electrically conductive members 115 (refer to FIG. 3), i.e. by so called bus bars. As shown in FIG. 3, on the side of the side plate 250, the electrically conductive member 115 connects together the negative terminal and the positive terminal of a pair of two adjacent battery cells 140 arranged along the longitudinal direction. The battery cells 140 are arranged along the longitudinal direction so that their positive terminals 111 and their negative terminals 112 alternate.

While this feature is not shown in FIG. 3, on the other side of the battery cells, i.e. on the side of the side plate 251, the electrically conductive member 115 connects together the positive terminal and the negative terminal of a pair of two adjacent battery cells 140 is arranged similarly as on the side of side plate 250 shown in FIG. 3, but with a shift corresponding to one battery cell in the longitudinal direction. In addition, another electrically conductive member 115 is provided at both longitudinal ends for connecting the terminal of the battery cell of the upper layer and the terminal of a battery cell of the lower layer.

Due to these electrically conductive members 115 provided on both sides of the battery cells along the longitudinal direction of the case member 110, all of the battery cells 140 that are housed within the case member 110 are electrically connected in series. Each of the electrically conductive members 115 is fixed to the side plates 250 or 251 by appropriate means, on the positions between the through-holes 201 of the side plate 250, 251.

As described above, the battery cells 140 are, for example, cylindrical lithium ion secondary cells, and their structural components such as cell elements and safety valves and so on are housed in the interiors of their cell casings, that are filled with electrolyte. A safety valve on the positive side is a cleavage valve that cleaves when, due to an abnormality such as overcharging or the like, the pressure internal to the cell casing becomes higher than a predetermined pressure. By cleaving, this safety valve functions as a fuse mechanism that intercepts electrical connection between the cell lid and a cell element on the positive side, and also functions as a pressure reduction mechanism that allows gas that has been generated in the interior of the cell casing, in other words the gas containing electrolyte in mist form or organic carbonate in mist form, to spurt out to the exterior of the cell casing.

A cleavage groove is also provided on the negative side of the cell casing, and cleaves when, due to an abnormality such as overcharging or the like, the pressure internal to the cell casing becomes higher than a predetermined pressure. Due to this, it is possible for the gas generated in the interior of the cell casing also to be allowed to spurt out from the negative terminal. The nominal output voltage of the battery cells 140 is 3.0 to 4.2 volts, and the average nominal output voltage is 3.6 volts.

Figure 18:
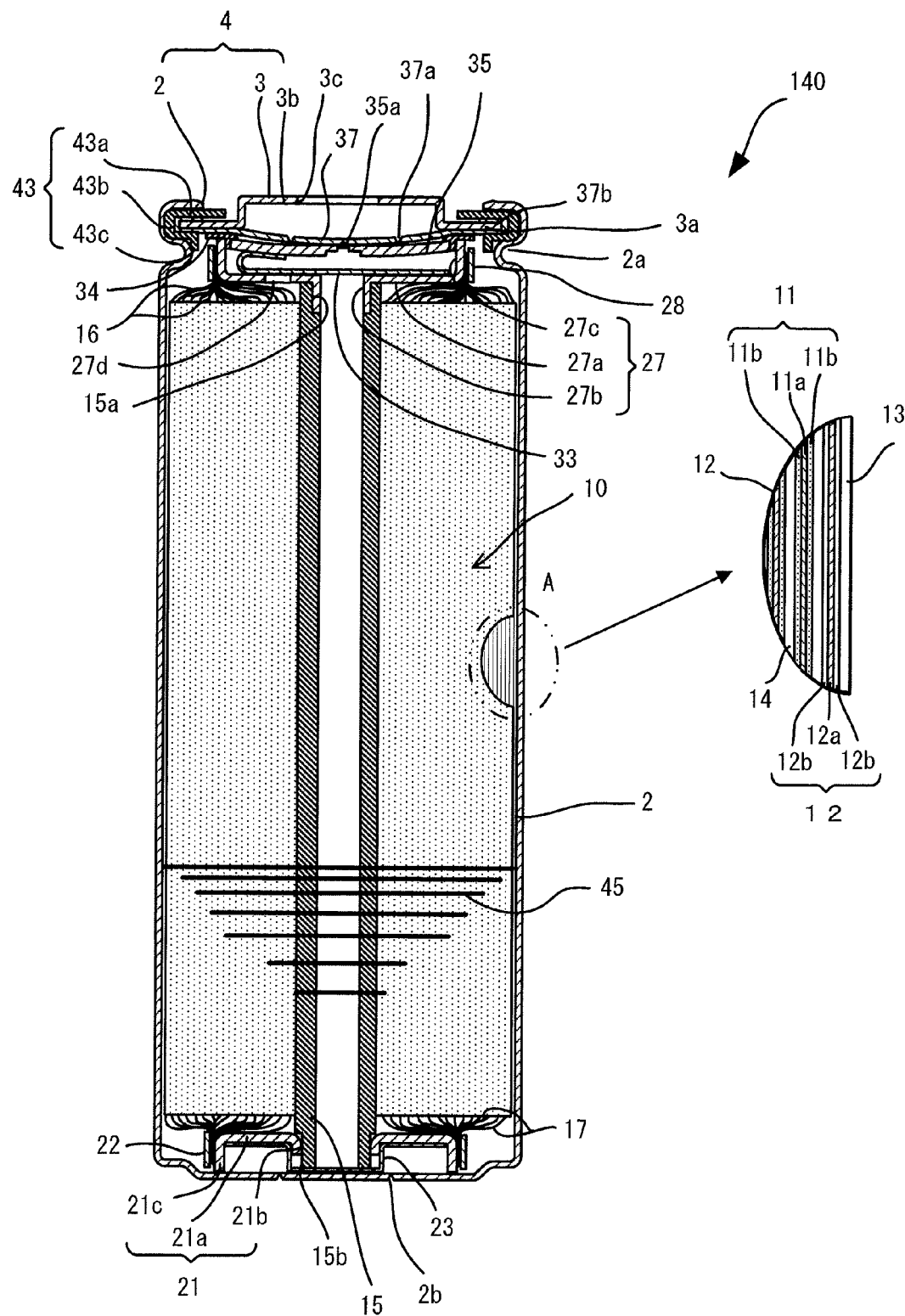
FIG. 18 is a sectional view of an embodiment of a battery cell.

FIG. 18 is a sectional view of an embodiment of the battery cell 140. This cylindrical secondary cell 140 may, for example, have external dimensions of 40 mm diameter and 100 mm height. This cylindrical secondary cell 1 has a cell casing 4 that is sealed from the exterior, and that is made by performing swaging processing upon a cylindrical cell casing 2 that has a bottom and a hat shaped lid member 3 (that constitutes the positive terminal), with the interposition of a seal member 43 that normally is termed a gasket. The cylindrical cell casing 2 having a bottom is made by press forming a metallic plate made from iron, aluminum, stainless steel or the like, and plated layers of nickel or the like are formed all over both its external surface and its internal surface. Near its upper end, that is its open end, this cell casing 2 is formed with a circumferential groove 2a that projects towards the interior of the cell casing 2. Various structural members for electricity generation, that will be explained below, are housed within the interior of the cell casing 2.

The reference numeral 10 denotes an electrode group, in which a positive electrode and a negative electrode are wound around an winding core 15. As shown by the enlarged portion A in the figure, this electrode group 10 includes a positive electrode 11, a negative electrode 12, and first and second separators 13, all wound together. The positive electrode 11 has a positive electrode sheet 11a made from aluminum foil and having an elongated shape, and a positive electrode processed portion in which a layer 11b is formed upon this positive electrode sheet 11a by applying a positive electrode mixture on both its sides. While this is not shown in the figure, the positive electrode mixture is not applied to the upper edge of the positive electrode sheet 11a along its longitudinal direction, so that the aluminum foil is left exposed and constitutes a positive electrode mixture untreated portion, with a large number of positive leads 16 being formed integrally at regular intervals on this positive electrode mixture untreated portion, so as to project upwards parallel to the winding core 15.

The positive electrode mixture consists of a positive electrode active material, a positive electrode conductive material, and a positive electrode binder. The positive electrode active material may desirably be a lithium metallic oxide or a lithium transition metallic oxide. As examples, lithium cobalt oxide, lithium manganate, lithium nickel oxide, a lithium compound metallic oxide (including two or more metal oxides selected from cobalt, nickel, and manganese), or the like may be cited.

The positive electrode binder is not particularly limited, provided that it can bind together the positive electrode active material and the positive electrode electrically conductive material, provided that it can bind the layer 11b of the positive electrode mixture 11b to the positive electrode sheet 11a, and provided that it is not greatly deteriorated by contact with the non-aqueous electrolyte. As examples of such a positive electrode binder, polyvinylidene fluoride (PVDF) or fluorine rubber or the like may be cited.

The negative electrode 12 has a negative electrode sheet 12a made from copper foil and having an elongated shape, and a negative electrode processed portion in which a layer 12b is formed upon this negative electrode sheet 12a by applying a negative electrode mixture on both its sides. While this is not shown in the figure, the negative electrode mixture 12b is not applied to the lower edge of the negative electrode sheet 12a along its longitudinal direction, so that the copper foil is left exposed and constitutes a negative electrode mixture untreated portion, with a large number of negative leads 17 being formed integrally at regular intervals on this negative electrode mixture untreated portion so as to project downwards parallel to the winding core 15, in the opposite direction to the positive leads 16.

The negative electrode mixture includes a negative electrode active material, a negative electrode binder, and a thickener. The negative electrode mixture may include a negative electrode electrically conductive material such as acetylene black or the like.

The first and second separators 13 and 14 are layers made from, for example, perforated polyethylene of thickness 40 μm. The widths of the first separator 13 and the second separator 14 are made to be greater than the width of the layer 12b of the negative electrode mixture that is applied to the negative electrode sheet 12a. Moreover, the width of the layer 12b of the negative electrode mixture that is applied to the negative electrode sheet 12a is made to be greater than the width of the layer 11b of the positive electrode mixture that is applied to the positive electrode sheet 11a. By making the width of the layer 12b of the negative electrode mixture to be greater than the width of the layer 11b of the positive electrode mixture, internal short circuiting due to the deposition of undesirable substance is prevented. This is because, in the case of a lithium ion secondary cell, the lithium that is the positive electrode active material permeates into the separator, and if, on the negative side, a portion of the negative electrode sheet 12a is exposed upon which no layer 12b of negative electrode active material is formed, then lithium will become deposited upon the negative electrode sheet 12a, and this will be a possible cause for the occurrence of internal short circuiting.

A stepped portion 15a with a diameter larger than the inner diameter of the winding core 15 is formed on the inner surface of the hollow cylindrical shaped winding core 15 at its upper end portion in the axial direction (the vertical direction in FIG. 18), and a positive electrode current collecting member 27 is pressed into this stepped portion 15a. This positive electrode current collecting member 27 may, for example, be made from aluminum, and includes a circular disk shaped base portion 27a, a lower cylindrical portion 27b that projects to face towards the winding core 15 at the surface of this base portion 27a facing the electrode group 10 and that is pressed over the inner surface of the stepped portion 15a, and an upper cylinder portion 27c that projects out towards the lid member 3 at the peripheral edge portion of the outer circumferential portion of the base portion 27a. An aperture 27d is formed at the base portion 27a of the positive electrode current collecting member 27, for allowing the escape of gas generated in the interior of the battery cell.

All of the positive leads 16 of the positive electrode sheet 11a are welded to the upper cylinder portion 27c of the positive electrode current collecting member 27. In this case, the positive leads 16 are overlapped over one another and joined to the upper cylinder portion 27c. Since the positive leads 16 are extremely thin, it would not be possible to take out any great current through just one of them. Because of this, the large number of positive leads 16 are formed at predetermined intervals along the total length of the positive electrode sheet 11a, from where it starts to be wound onto the winding core 15 to its end portion at the outer end of the winding.

Since the positive electrode current collecting member 27 is oxidized by the electrolyte, it is possible to enhance its reliability by making it from aluminum. With aluminum, when the surface is exposed by any type of processing, a thin coating layer of aluminum oxide is immediately formed upon this surface, and this coating layer of aluminum oxide makes it possible to prevent further oxidization by the electrolyte. Furthermore, by forming the positive electrode current collecting member 27 from aluminum, it becomes possible to weld the positive leads 16 of the positive electrode sheet 11a to this member by ultrasonic welding or spot welding or the like.

A small stepped portion 15b is formed at the external periphery of the lower end portion of the winding core 15 having an external diameter smaller than the external diameter of the winding core 15, and a negative electrode current collecting member 21 is fixed to this stepped portion 15b by being pressed thereover. This negative electrode current collecting member 21 may, for example, be made from copper, and has a base portion 21a that is formed as a circular disk having an opening portion 21b formed therein that is press fitted over the stepped portion 15b of the winding core 15, and an external circumferential cylindrical portion 21c that is formed at its outer peripheral edge and that projects outwards as seen looking at the bottom portion of the cell casing 2. All of the negative leads 17 of the negative electrode sheet 12a are welded to the external circumferential cylindrical portion 21c of the negative electrode current collecting member 21 by ultrasonic welding or the like. Since each of the negative leads 17 is extremely thin, in order to take out a large current, a large number thereof are formed at predetermined intervals along the total length of the negative electrode sheet 12a, from where it starts to be wound onto the winding core 15 to its end portion at the outer end of the winding.

The negative leads 17 of the negative electrode sheet 12a and an annular pressure member 22 are welded to the external periphery of the external circumferential cylinder portion 21c of the negative electrode current collecting member 21. The large number of negative leads 17 are brought into close contact against the external periphery of the external circumferential cylinder portion 21c of the negative electrode current collecting member 21, are temporarily fixed in place by the pressure member 22 being wound over their external surfaces, and are then welded in this state.

A negative electrode conducting lead 23 that is made from copper is welded to the lower surface of the negative electrode current collecting member 21. This negative electrode conducting lead 23 is welded to the cell casing 2 at the bottom portion of the cell casing 2. The cell casing 2 may, for example, be made from carbon steel of thickness 0.5 mm, and a nickel plated layer may be formed upon its surface. By using this type of material, it is possible to weld the negative electrode conducting lead 23 to the cell casing 2 by resistance welding or the like.

An annular cleavage groove (i.e., safety valve) 2b is formed on the bottom surface of the cell casing 2. This cleavage groove 2b is formed on the outer surface of the cell casing 2 by stamping so that its cross section takes a letter-V shape in a press forming, and so that the remaining portion of the groove is quite thin. The cleavage groove 2b is a structure that serves the function of a safety valve on the negative side, and it breaks if, due to overcharging or the like, the pressure in the interior of the cell casing becomes greater than a predetermined pressure.

The positive leads 16 of the positive electrode sheet 11a and the annular pressure member 28 are welded to the external circumference of the upper tubular portion 27c of the positive electrode current collecting member 27. The large number of positive leads 16 are brought into close contact against the external periphery of the upper tubular portion 27c of the positive electrode current collecting member 27, are temporarily fixed in place by the pressure member 28 being wound over their external surfaces, and are then welded in this state.

One end of a flexible connection member 33 that is made by laminating together a plurality of layers of aluminum foil is joined by welding to the upper surface of the base portion 27a of the positive electrode current collecting member 27. By the plurality of layers of aluminum foil being laminated and integrated together, this connection member is made to be capable of conducting a large current, and moreover is endowed with flexibility. In other words, while it is necessary for the thickness of the connection member to be relatively great in order for it to conduct a high current, if it were to be formed from a single metallic plate, then its rigidity would become high, and its flexibility would be lost. Accordingly, it is endowed with flexibility by laminating together a large number of sheets of aluminum foil whose individual thicknesses are small. The thickness of the connection member 33 may, for example, be around 0.5 mm, and it may be made by laminating together five sheets of aluminum foil that have individual thicknesses of 0.1 mm.

An annular insulation plate 34 that is made from an insulating resin material and that has a circular opening portion is mounted upon the upper cylinder portion 27c of the positive electrode current collecting member 27. This insulation plate 34 has a hollow side portion that is formed to project downwards, and a connection plate 35 is fitted into this hollow side portion. The other end of the flexible connection member 33 is fixed to the lower surface of this connection plate 35 by welding.

The connection plate 35 is made from aluminum alloy, and is almost entirely uniform except for its central portion, but its central portion is bent somewhat downwards, so that it is made almost in the form of a dish. The thickness of this connection plate 35 may, for example, be around 1 mm. A projecting portion 35a that is formed thin and in a dome shape is formed in the center of the connection plate 35, and a plurality of opening portions are formed around this projecting portion 35a, although these cannot be seen in the figure. These opening portions allow gas generated in the interior of the cell to escape.

The projecting portion 35a of the connection plate 35 is joined to the bottom surface of the central portion of a diaphragm (i.e. a safety valve) 37 by resistance welding or friction stir welding. This diaphragm 37 is made from aluminum alloy, and has a circular cleavage groove 37a that is centered around the central portion of the diaphragm 37. This cleavage groove 37a is formed on the upper surface of the diaphragm 37 by stamping so that its cross section takes a letter-V shape in a press forming, and so that the remaining portion of the groove is quite thin.

The diaphragm 37 is a structure that serves the function of a safety valve on the positive side, and if the pressure in the interior of the cell casing rises, then in a first stage this diaphragm 37 bends upwards and its junction to the projecting portion 35a of the connection plate 35 breaks away, so that the diaphragm 37 is separated from the connection plate 35 and its electrical continuity with the connection plate 37 is broken. Then, if the internal pressure increases yet further, at a second stage the cleavage groove 37a ruptures, thus providing the function of venting the gas interior to the cell.

At its periphery, the diaphragm 37 is fixed to the periphery of a lid member 3 by swaging. The lid member 3 is made from a ferrous material such as carbon steel or the like, and both its interior surface and its exterior surface are entirely covered with a plated layer of nickel or the like. This lid member 3 is formed in the shape of a hat, and has a peripheral portion 3a formed as a circular disk that contacts the diaphragm 37 and a head portion 3b that projects upwards from this peripheral portion 3a. An opening portion 3c is formed in the head portion 3b. This opening portion 3c is for venting gas to the exterior of the cell, if and when the diaphragm 37 breaks due to the pressure of gas that is generated in the interior of the cell. The lid member 3 functions as the positive terminal 111, and the bottom portion of the cell casing 2 functions as the negative terminal 112.

A seal member 43, normally termed a gasket, is provided for covering the side portion 37b of the diaphragm 37 and surrounding portions. Here, this seal member 43 is made from rubber, but this is not intended to be limitative; an example of another possible material that could be used is ethylene propylene copolymer (EPDM). Moreover, for example, the cell casing 2 may be made from carbon steel of thickness 0.5 mm and may have external diameter of 40 mm, while the thickness of the seal member 43 may be around 1.0 mm.

Initially, the seal member 43 has a shape having an external circumferential wall portion 43b that is formed to stand up almost vertically upwards at the external peripheral edge of an annular base portion 43a, and a cylinder portion 43c that is formed to drop almost vertically downwards from this base portion 43a at its internal peripheral edge.

And swage processing is performed by pressing or the like, so that, by the external circumferential wall portion 43b of the seal member 43 being bent along with the cell casing 2, the diaphragm 37 and the lid member 3 are pressed into contact in the axial direction by the base portion 43a and the external circumferential wall portion 43b. Due to this, the lid member 3, the diaphragm 37, the insulation plate 34, and the connection plate 35 are fixed to the cell casing 2 as a unit.

A predetermined amount of a non-aqueous electrolyte 45 is injected into the interior of the cell casing 2. One desirable example of this non-aqueous electrolyte is a lithium salt dissolved in a carbonate series solvent. Lithium hexafluorophosphate ($LiPF_6$), lithium tetrafluoroborate ($LiBF_4$), or the like may be cited as examples of lithium salts. Moreover, ethylene carbonate (EC), dimethyl carbonate (DMC), propylene carbonate (PC), methyl-ethyl carbonate (MEC), or mixtures of solvents chosen from two or more of the above solvents, may be cited as examples of carbonate type solvents.

Figure 19:
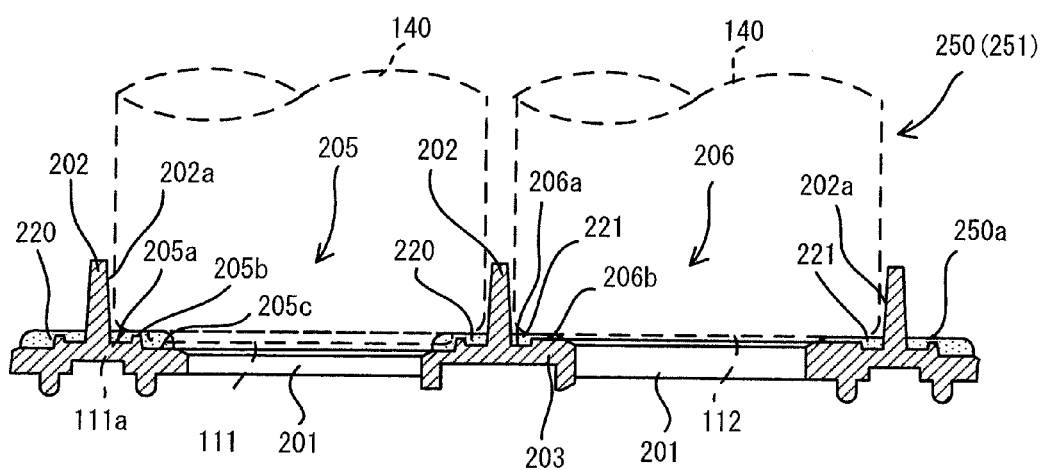
FIG. 19 is a sectional view showing a relationship between battery cells and a side plate.

FIG. 19 is a sectional view showing the way in which the battery cells 140 that are housed within the case member 110 are held by the side plates 250 (251). The side plates 250 and 251 have a similar construction, each having been provided with positive terminal reception portions 205 for holding positive terminals 11 of battery cells 140 and negative terminal reception portions 206 for holding negative terminals, in which these positive/negative reception portions 205 and 206 are alternately arranged. However, since their basic structures are common, in the following only the side plate 250 will be explained as a representative.

As described above, the main portion 203 of the side plate 250 is thinner than its peripheral portion, and a plurality of through-holes 201 are formed in this main portion 203 for exposing the positive electrodes and the negative electrodes of the battery cells 140 to the exterior. An annular wall portion 202 is formed around the periphery of each of these through-holes 201, having an opening portion 202a that is slightly larger than the external diameter of the battery cells 140. These wall portions 202 serve as guide members when loading the battery cells 140. As seen from the FIGS. 3 and 15, the through-holes 201 arranged on the upper side and the through-holes 201 arranged in the lower side are arranged so that the centers of these through-holes are mutually shifted between the upper side and the lower side in the longitudinal direction by amount of half of the pitch between the two adjacent battery cells 140 in the longitudinal direction. A portion of each cylinder wall portion 202 is common with a portion of the cylinder wall portion 202 that corresponds to an adjacent through-hole 201, and they are formed entirely integrally with the side plates 250 (and 251).

Between each of the through-holes 201 and each cylinder wall portion 202, there is formed either a positive terminal reception portion 205 that holds the positive terminal 11 of a battery cell 140 or a negative terminal reception portion 206 that holds a negative terminal. The positive terminal reception portions 205 and the negative terminal reception portions 206 are arranged alternately along the longitudinal direction of the case member 110. In this case, the positive terminal reception portions 205 and the negative terminal reception portions 206 that are formed upon the side plate 251 are arranged so that, on each single through-hole 201, there corresponds a terminal reception portion of opposite polarity to that of the corresponding terminal reception portion on the other side plate 250.

In each of the positive terminal reception portions 205, a low annular projecting portion 205b is formed on the inside of the wall portion 202 so as to have a height that is much lower than that of the wall portion 202. A groove 205a is formed between this projecting portion 205b and the wall portion 202. A positive terminal reception surface 205c is defined between the projecting portion 205b of the positive terminal reception portion 205 and the opening portion 201. The bottom surface of the annular groove 205a is formed at a position that is a little higher than the bottom surface of this positive terminal reception surface 205c. The width and the area of the annular groove 205a are made to be somewhat smaller than the width and the area, respectively, of the positive terminal reception surface 205c.

An adhesive 220 of a room temperature curing type is applied to the upper surfaces of the projecting portion 205b, to the interiors of the annular groove 205a, and on the positive terminal reception surface 205c. This adhesive 220 is applied uniformly all over on the portions 205a, 205b and 205c, so that its upper surface is almost flat. Due to this, the adhesive 220 is charged into the annular groove 205a so that no gap remains, and thus is formed as a thicker layer within the annular groove 205a, than upon the upper surface of the positive terminal reception surface 205b.

As shown by the dashed line in the figure, the positive terminal 111 of a battery cell 140 (i.e. the lid member 3 of FIG. 18) is pressed against the upper surface of the adhesive 220 that has been formed in this manner. This positive terminal 111 is pressed hard against the adhesive 220 that is formed upon the positive terminal reception surface 205c, and is thus adhered to the side plate 250. Moreover, although the peripheral portion 111a of the positive terminal 111 of the battery cell 140 is a portion that is somewhat recessed from the surface of the positive terminal 111, this peripheral portion 111a is adhered to the side plate 250 by the adhesive 220 that is formed within the groove 205a. This adhesive 220 that is formed within the groove 205a reliably adheres to and seals around the entire periphery of the peripheral portion 111a of the positive terminal 111, and reliably separates the space that is more inward than the groove 205a and the space that is to the exterior thereof. This state is maintained even after the adhesion process.

An annular groove 206a is formed on the negative terminal reception portion 206, inside the wall portion 202. A negative terminal reception surface 206b is defined between this annular groove 206a and the opening portion 201. The width and the area of the annular groove 206a are made to be somewhat smaller than the width and the area, respectively, of the negative terminal reception surface 206c.

An adhesive 221 of a room temperature curing type is applied within the annular groove 206a and on the negative terminal reception surface 206b. This adhesive 221 is applied uniformly all over on the portions 206a and 206b, so that its upper surface is almost flat. Due to this, the adhesive 221 is charged into the annular groove 206a so that no gap remains, and thus, within the annular groove 206a, is formed as a thicker layer than upon the upper surface of the negative terminal reception surface 206b.

As shown by the dashed line in the figure, the negative terminal 112 of a battery cell 140 (i.e. the bottom portion of the cell casing 2 of FIG. 18) is pressed against the upper surface of the adhesive 221 that has been formed in this manner. This negative terminal 112 is pressed hard into the adhesive 221 that is formed upon the negative terminal reception surface 206c, and is thus adhered to the side plate 250. Moreover, the peripheral portion of the negative terminal 112 of the battery cell 140 is adhered to the side plate 250 by the adhesive 221 that is formed within the groove 206a. This adhesive 221 that is formed within the groove 206a reliably adheres to and seals around the entire periphery of the peripheral portion of the negative terminal 112, and reliably separates the space that is more inward than the groove 206a and the space that is to the exterior thereof. This state is maintained even after the adhesion process.

As described above, the adhesive 220 that is charged into the annular groove 205a of the positive terminal reception portion 205 is adhered in a reliable manner to the entire periphery of the peripheral portion 111a of the positive terminal 111, and similarly the adhesive 221 that is charged into the annular groove 206a of the negative terminal reception portion 206 is adhered in a reliable manner to the entire periphery of the peripheral portion of the negative terminal 112. Moreover, this state is maintained even after the adhesion process has been completed. Due to this, the cooling medium that flows within the case member 110 from the cooling medium inlet 141 towards the cooling medium outlet is sealed in by the adhesive 220 that is charged into the annular groove 205a of the positive terminal reception portion 205 and by the adhesive 221 that is charged into the annular groove 206a of the negative terminal reception portion 206, and does not flow out to the outer side of the side plate 250 (or 251).

Moreover even if, due to a collision or the like, excessive shock or vibration is imposed upon this electricity storage device 100 and one of the battery cells 140 is damaged, or if due to overcharging or an undesired short circuit the internal pressure within one of the battery cells 140 becomes elevated and the cleavage groove 2b or 37a of that battery cell 140 breaks and a gas including liquid in mist form spurts or leaks out from the interior of the battery cell 140, this gas including liquid in mist form is sealed in by the adhesive 220 that is charged into the annular groove 205a of the positive terminal reception portions 205 and by the adhesive 221 that is charged into the annular groove 206a of the negative terminal reception portions 206, and does not flow in to the inner side of the side plate 250 (or 251).

As described above, a gas discharge space Sg is defined between the side plate 250 (251) and the cover member 260 (261) by fastening the cover member 260 (261) onto the outside of the side plate 250 (251).

Members for gas discharge are provided to the recessed portion 110A of the case member 110 in order to vent a gas including liquid in mist form into the gas discharge spaces Sg to the exterior of the battery module 100. As shown in FIG. 4, projecting portions (i.e. guide portions) 120 and 121 that protrude within the recessed portion 110A are formed integrally with the main portions 203 (refer to FIG. 3) of the side plates 250 and 251 respectively on their sides towards the case member 110. Each of these projecting portions 120 and 121 has a hollow cylindrical shape, with a through-hole 122 pierced through its interior being communicated with the corresponding one of the gas discharge spaces Sg. With regard to the external diameters of the end portions of these projecting portions 120 and 121, their tip end portions are the smallest, and they become bigger gradually towards its base, i.e. towards the side of the side plates 250 and 251. In other words, the external circumferential surfaces of the projecting portions 120 and 121 are formed as tapered shapes.

Figure 5:
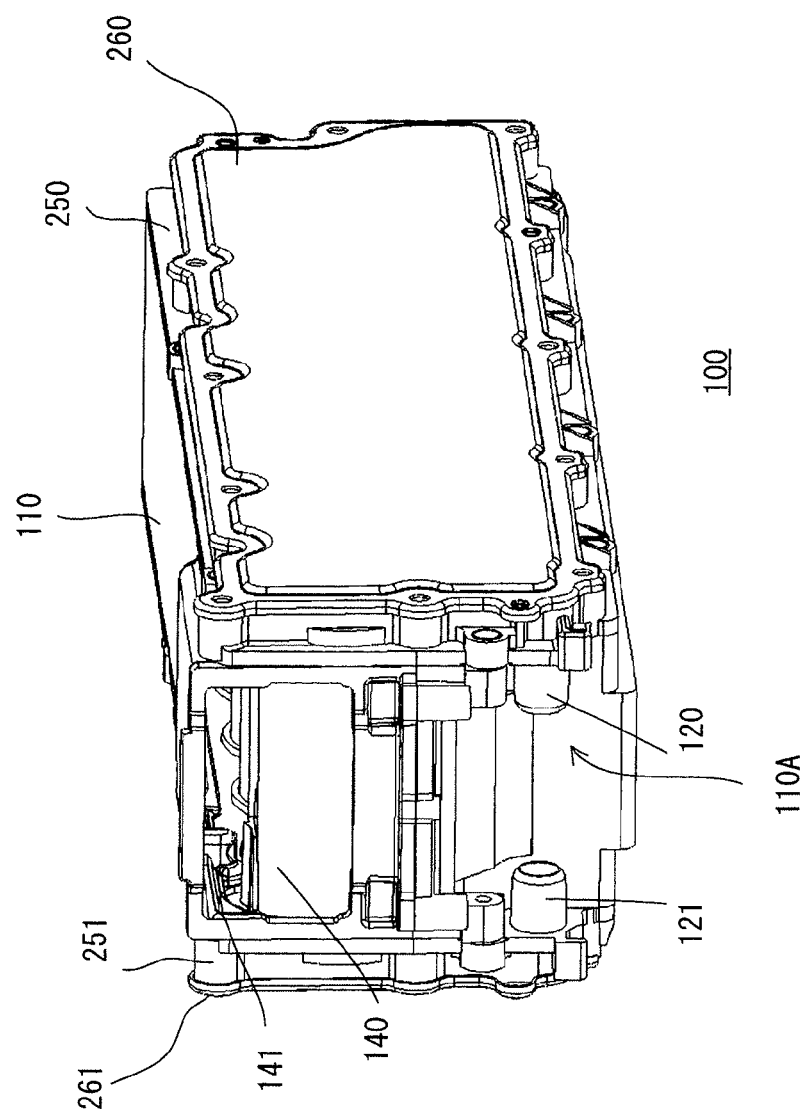
FIG. 5 is an external perspective view, showing the battery module of FIG. 2 in its state with an exhaust gas venting unit removed.

FIG. 5 is a figure showing the battery module 100 in a state in which a member for gas discharge including a tubular rubber member (guide portion communication member) 160 is removed from the battery module 100 shown in FIG. 4. that The tubular rubber member (guide portion communication member) 160 is fitted over both of the projecting portions 120 and 121.

Figure 6A:
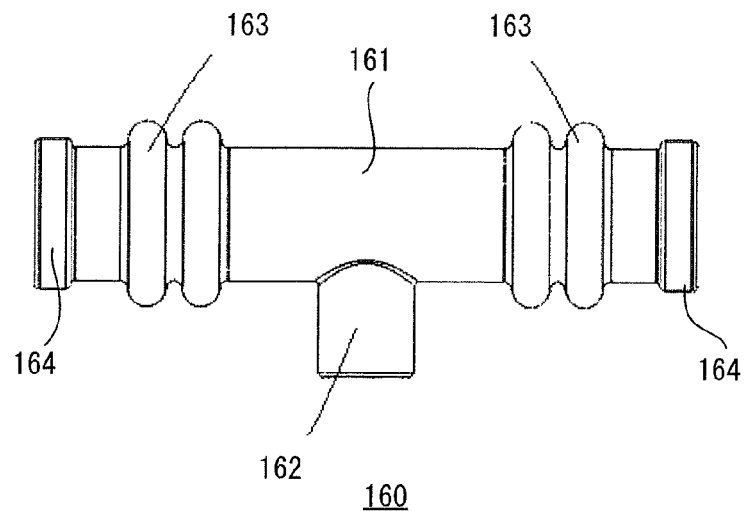
FIGS. 6A and 6B are views showing a tubular rubber member for conducting vented gas, with FIG. 6A being a figure showing its external appearance, and FIG. 6B being a sectional view.
Figure 6B:
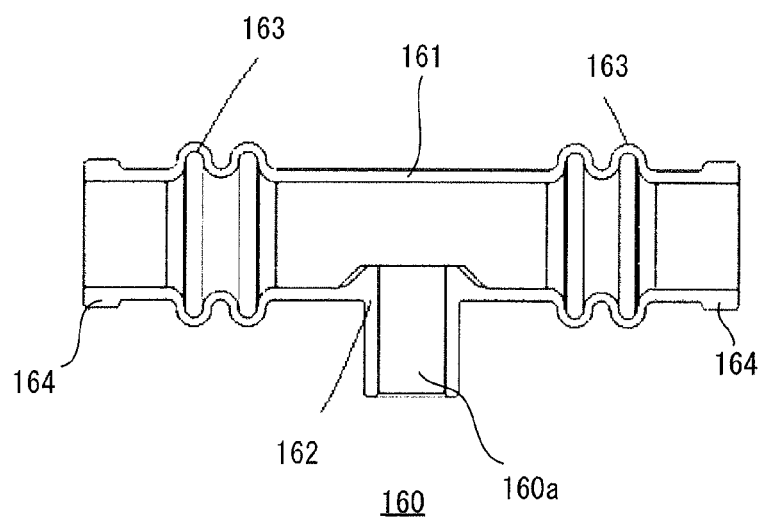

FIG. 6A is a plan view of the tubular rubber member 160, and FIG. 6B is a sectional view of FIG. 6A. The tubular rubber member 160 may, for example, be made from ethylene propylene copolymer (EPDM) or the like, and has a horizontal hollow tubular portion 161 and a vertical hollow tubular portion 162 that is perpendicular to this horizontal hollow tubular portion 161. A through-hole 160a is formed in the hollow tubular portion 162 that is vertical to the hollow tubular portion 161. Bellows portions 163 in which large diameter portions and small diameter portions are connected in sequence in a wavelike arrangement are formed at each end of the horizontal hollow tubular portion 161. These bellows portions 163 can be extended and retracted simply and easily by a light load, because they are made comparatively thin. And both the tip end portions 164 are formed to be thicker than the bellows portions 163. The internal diameters of these tip end portions 164 are larger than the external diameters of the tip end portions of the end portions of the projecting portions 120 and 121 remote from the side plates 250 and 251 respectively, and are smaller than the external diameters of the projecting portions 120 and 121 from positions partway therealong to the side plates 250 and 251 respectively. The tip end portions 164 of the tubular rubber member 160 are fitted over the projecting portions 120 and 121 up to near their far ends (in the neighborhood of the side plates 250 and 251 respectively).

Since the internal diameters of the tip end portions 164 of the tubular rubber member 160 are larger than the external diameters of the tip end portions of the projecting portions 120 and 121 respectively, accordingly it is simple and easy to fit the tip end portions 164 of the tubular rubber member 160 over the end portions of the projecting portions 120 and 121 respectively. Furthermore, since the internal diameters of the tip end portions 164 of the tubular rubber member 160 are smaller than the external diameters of the projecting portions 120 and 121 from positions partway therealong to the side plates 250 and 251 respectively, and also these tip portions 164 are made to be thicker, accordingly the fitting of the tubular rubber member 160 that is implemented by engaging the tip end portions 164 of the tubular rubber member 160 far over the projecting portions 120 and 121 (as far as the neighborhood of the side plates 250 and 251 respectively) becomes reliable and cannot easily come off. Moreover, since the bellows portions 163 are formed at both end portions of the tubular rubber member 160, accordingly, it is possible to absorb variations of the distance between the projecting portions 120 and 121 due to these bellows portions 163 being extended and retracted, and also the task of fitting the tubular rubber member 160 becomes simple and easy. Furthermore, with this construction, the tubular rubber member 160 will never fall off due to vibration or shock imposed upon the vehicle, for the following reasons: (1) since the tubular rubber member 160 is made from rubber, it is possible simply and easily to set its fitting strength to be appropriate by appropriately selecting its hardness; (2) in the state that the tubular rubber member 160 is fitted, the direction of fitting is perpendicular to the direction of gravity and the projecting portions 120 and 121 face one another; (3) the bellows portions 163 are formed at both ends of the tubular rubber member 160, and they extend and retract when subjected to a light load.

Figure 11:
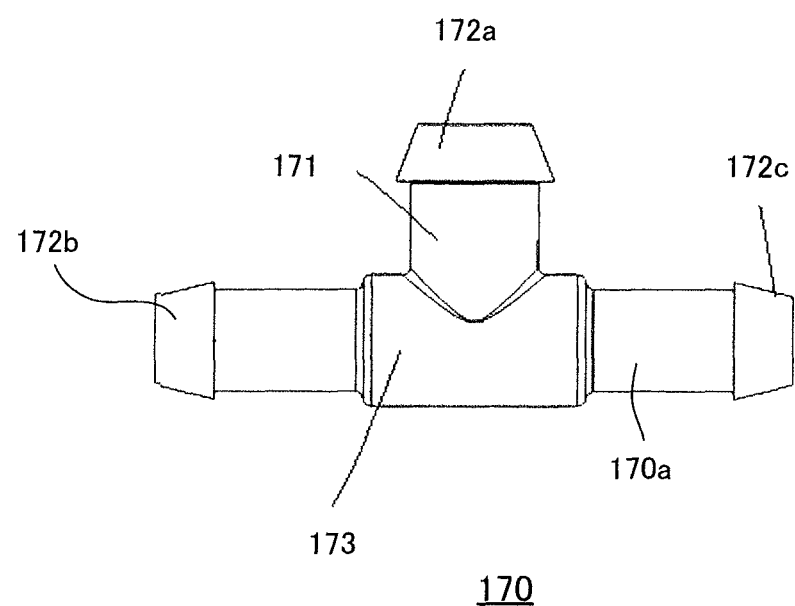
FIG. 11 is a plan view of a letter-T shaped coupling, that is yet another structural member of the gas discharge device.

A letter-T shaped coupling 170 is connected to the vertical hollow tubular portion 162 that is formed almost at the central portion of the horizontal hollow tubular portion 161 of the tubular rubber member 160. FIG. 11 shows a plan view of this letter-T shaped coupling 170. The letter-T shaped coupling 170 is a pipe shaped coupling that is made from a synthetic resin such as polypropylene (PP) or the like, and has a horizontal hollow portion 170a and a vertical hollow portion 171. Thus the letter-T shaped coupling 170 has three end portions, and, on each of these end portions, there is formed a conically shaped portion 172a, 172b, 172c having a large diameter portion and a tapered portion that becomes smaller in diameter from this large diameter portion towards the tip end.

Figure 7:
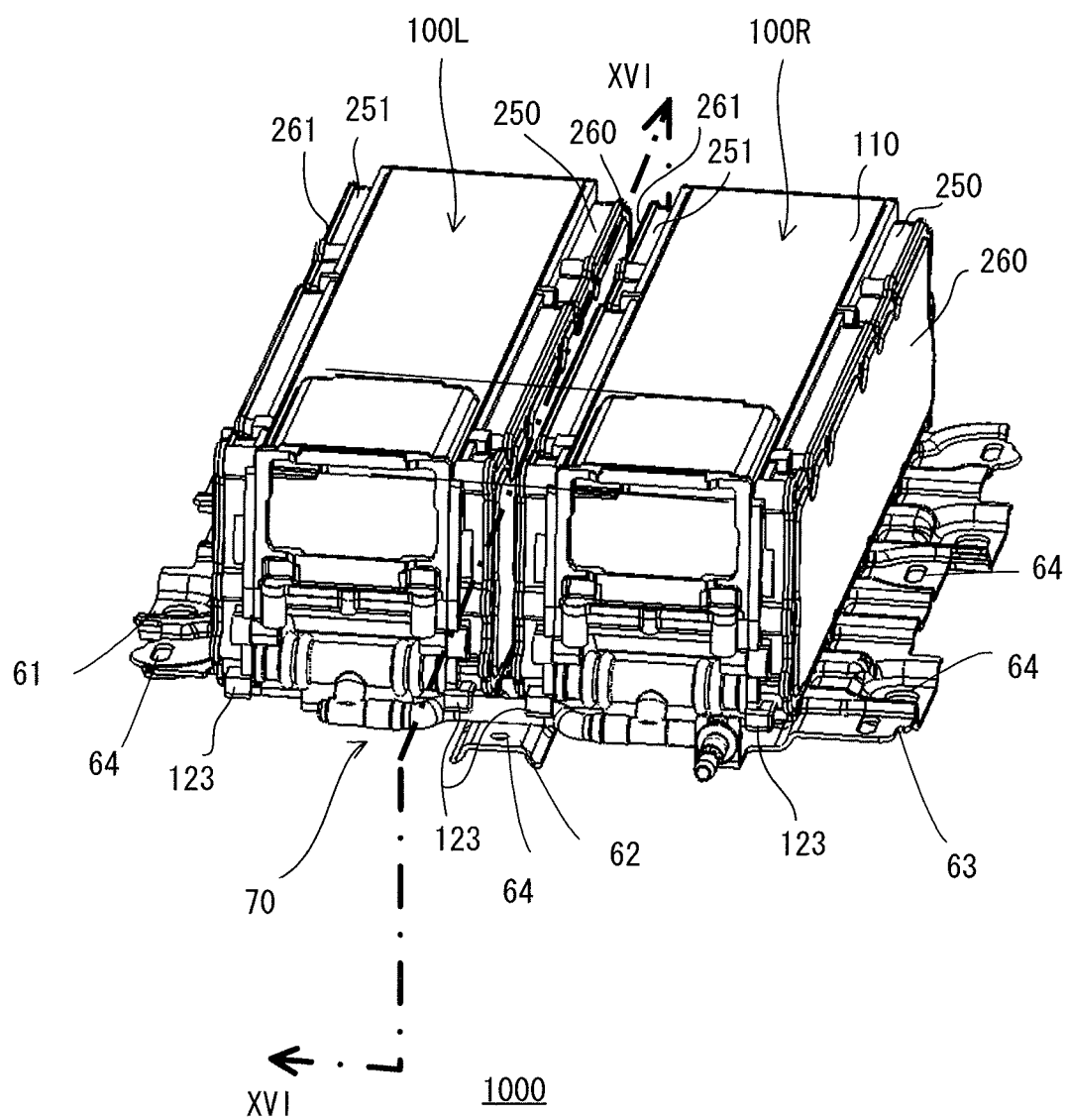
FIG. 7 is an external perspective view, showing an embodiment of an electricity storage device that is constructed using battery modules of the present invention.

Referring to FIGS. 3, 4 and 7, the connection structure of the letter-T shaped coupling 170 and the letter-L shaped tubular rubber member 150 is explained below.

The conically shaped portion 172a that is formed on the end portion of the vertical hollow tubular portion 171 of the letter-T shaped coupling 170 is fitted into the vertical hollow tubular portion 162 of the tubular rubber member 160. As shown with the right-hand side battery module 100R in FIG. 7, a letter-L shaped tubular rubber member 150 is connected to one end portion of the letter-T shaped coupling 170, and a straight type coupling 180 is connected to this letter-L shaped tubular rubber member 150. A large diameter portion 173 (refer to FIG. 11) is formed at the central portion of the horizontal hollow tubular portion of the letter-T shaped coupling 170. The end surface of the tubular rubber member 150 that is connected to the horizontal hollow tubular portion of the letter-T shaped coupling 170 is contacted against the edge surface of this large diameter portion 173 of this letter-T shaped coupling 170. In other words, the large diameter portion 173 of the letter-T shaped coupling 170 becomes a stopper when the tubular rubber member 150 is fitted over it, and thus functions the function of positional determination. It should be understood that, in FIGS. 3 and 4, for simplicity of explanation, an letter-L shaped coupling 190 (see FIG. 9) is shown in place of the letter-L shaped coupling 170.

Figure 13:
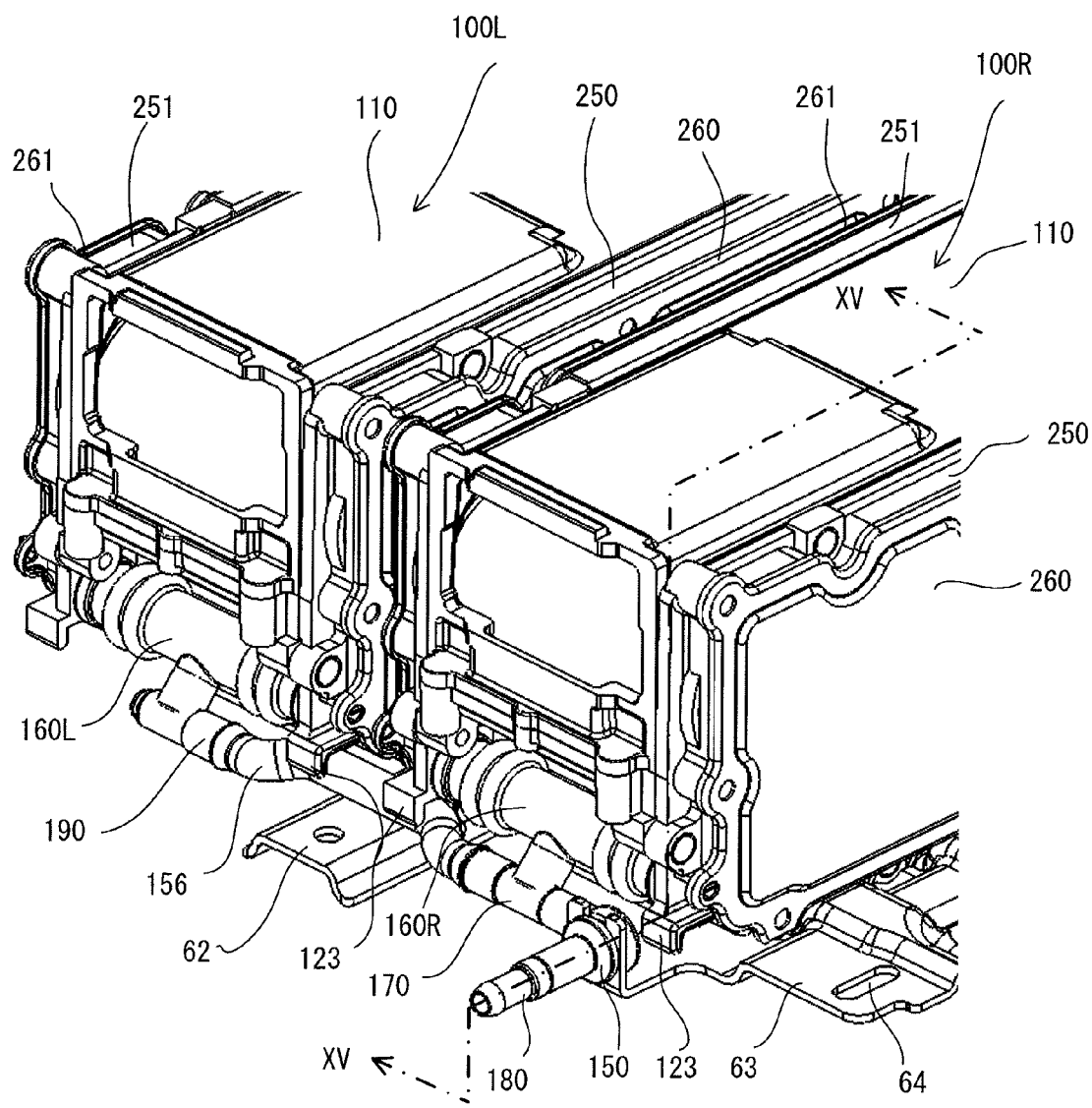
FIG. 13 is an enlarged perspective view of a principal portion of the electricity storage device shown in FIG. 7.

Next the electricity storage device according to the present invention, that is assembled using a plurality of the battery modules explained in the embodiment described above, will be explained. FIG. 7 is an external perspective view showing an embodiment of the electricity storage device of the present invention. The electricity storage device 1000 shown in FIG. 7 is essentially the electricity storage device 1000 shown in FIG. 1, with the control device 900 being omitted. And FIG. 13 is an enlarged perspective view of a principal portion of the electricity storage device 1000 shown in FIG. 7.

A plurality of the battery modules 100 are employed in this electricity storage device 1000, and assembled together. In the example shown in the figures, two of the battery modules 100 are employed. This electricity storage device 1000 incorporates a gas discharge device 70 (see FIG. 8) connected to the battery modules at the recessed portions 110A of the case members 110 of the battery modules 100. The battery modules 100 incorporated in the electricity storage device 1000 are integrated together and fixed by a module base 60 that consists of a plurality of support fixing members 61, 62 and 63. In other words, the electricity storage device 1000 incorporates the two battery modules 100, the gas discharge device 70, and the module base 60.

The two battery modules 100 are held and fixed in place by the plurality of support fixing member (hereinafter called also "brackets") 61, 62, and 63 that are incorporated in the module base 60. These brackets 61, 62, and 63 are engaged to the case members 110 of the battery modules 100 by bolts or the like. Each of the brackets 61, 62, and 63 is a component for connection of the two battery modules 100 and fixing them to the vehicle, and, by changing the shapes of the brackets 61, 62, and 63 and the positions of screw holes 64 in them, it becomes possible to attach them to vehicles of different types. As shown in FIG. 7, the shapes of the brackets 61, 62, and 63 and the positions of the screw holes 64 are set so that the screw holes 64 are positioned to project further outwards than the sides of the battery modules 100. Due to this, when the completed electricity storage device 1000 is to be fixed to the vehicle, it is possible to perform this operation from above the battery modules 100 by using engagement components such as bolts or nuts.

Figure 8:
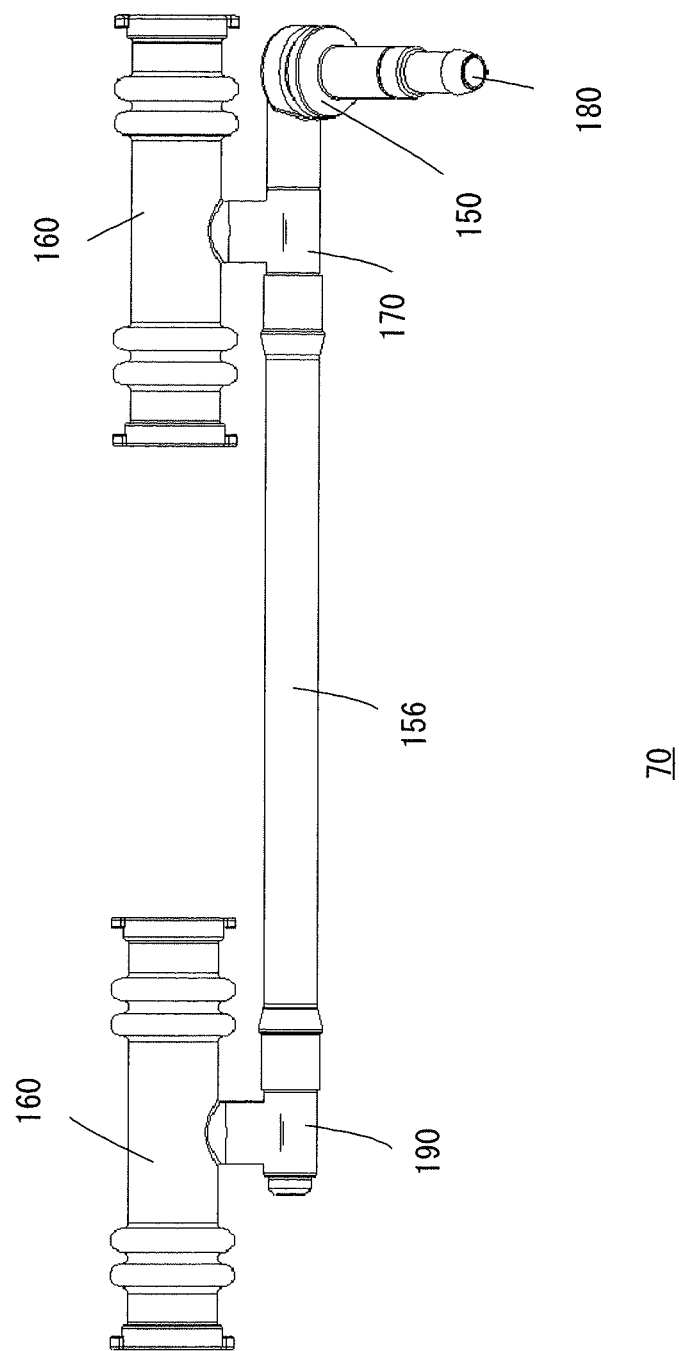
FIG. 8 is an overall plan view of a gas discharge device used in the battery module of the present invention.

FIG. 8 shows the gas discharge device 70.

The gas discharge device 70 includes two of the tubular rubber members 160, a letter-L shaped coupling 190 that is connected to one of these tubular rubber members 160, the letter-T shaped coupling 170 that is connected to the other one of the tubular rubber members 160, a linking tubular rubber member 156 one end of which is connected to the letter-L shaped coupling 190 and the other end of which is connected to one end of the letter-T shaped coupling 170, the letter-L shaped tubular rubber member 150 that is connected to the other end of the letter-T shaped coupling 170, and a straight type coupling 180 that is connected to this letter-L shaped tubular rubber member 150. The constructions of the tubular rubber member 160 and of the letter-T shaped coupling 170 are as described above.

Figure 9:
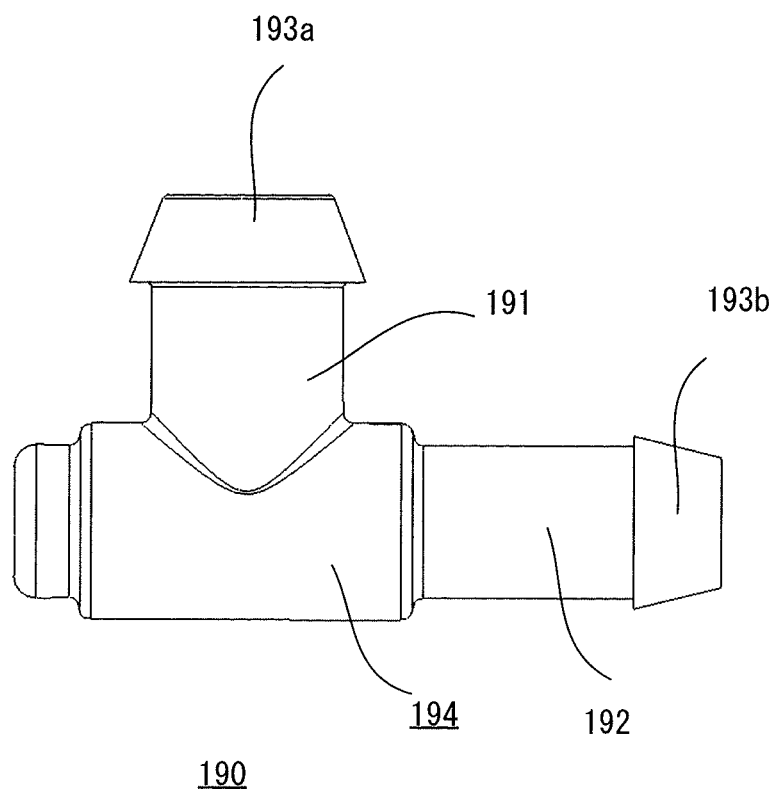
FIG. 9 is a plan view of a letter-L shaped coupling, that is a structural member of this gas discharge device.

FIG. 9 is a plan view of the letter-L shaped coupling 190. This letter-L shaped coupling 190 is a pipe shaped coupling, and has a vertical hollow tubular portion 191 and a horizontal hollow tubular portion 192. Conically shaped portions 193a and 193b are formed upon the end portions of the vertical hollow tubular portion 191 and of the horizontal hollow tubular portion 192, respectively. A large diameter portion 194 is formed at the central portion of the horizontal hollow tubular portion of this letter-L shaped coupling 190. The end surface of the tubular rubber member 156 that is connected to the horizontal hollow tubular portion of this letter-L shaped coupling 190 is contacted against the end surface of this large diameter portion 194 of the letter-L shaped coupling 190. In other words, the large diameter portion 194 of this letter-L shaped coupling 190 constitutes a stopper when the tubular rubber member 156 is fitted to the coupling 190, and serves the function of positional determination thereof.

Figure 10:
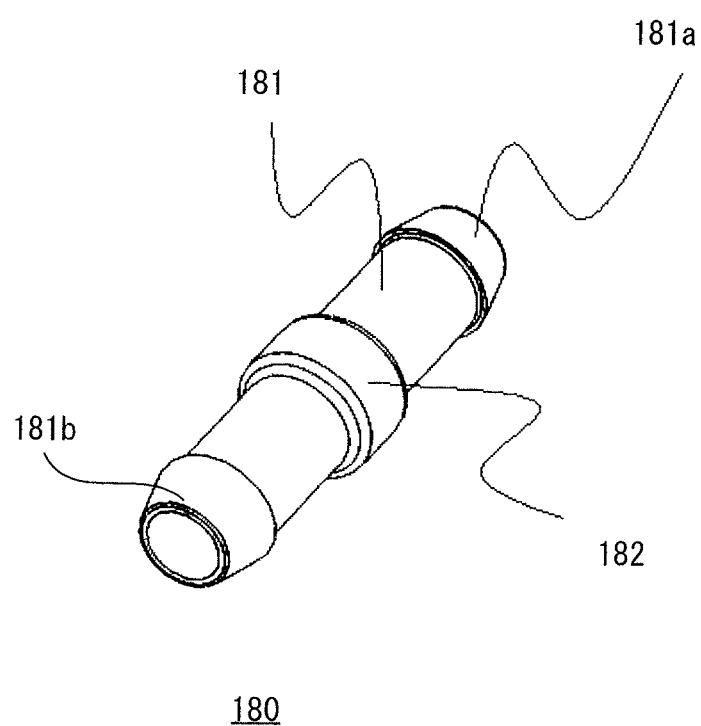
FIG. 10 is a perspective view of a straight type coupling, that is another structural member of the gas discharge device.

FIG. 10 is a perspective view showing the external appearance of the straight type coupling 180. This straight type coupling 180 is a pipe shaped coupling formed as a straight line, and conically shaped portions 181a and 181b are formed at both ends of the straight type coupling 180. Moreover, a large diameter portion 182 is formed at almost the central portion of the straight type coupling 180, and serves the function of positional determination when a tubular rubber member is fitted over the coupling 180. The letter-L shaped coupling 190 and the straight type coupling 180 are made from a synthetic resin such as PP or the like, just like the letter-T shaped coupling 170.

Figure 12:
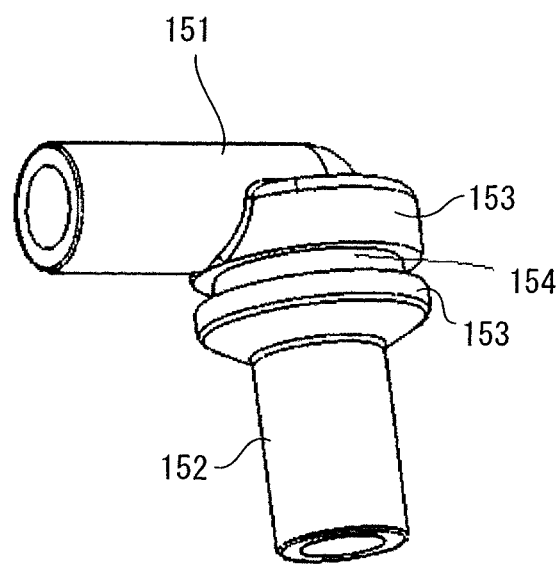
FIG. 12 is a perspective view of a letter-L shaped tubular rubber member, that is a yet further structural member of the gas discharge device.

FIG. 12 is a perspective view of the letter-L shaped tubular rubber member 150. This letter-L shaped tubular rubber member 150 has a horizontal hollow tubular portion 151 and a vertical hollow tubular portion 152. Two large diameter portions 153 and a small diameter portion 154 that is positioned between these large diameter portions 153 are formed in the vicinity of the connection portion between the horizontal hollow tubular portion 151 and the vertical hollow tubular portion 152 of the letter-L shaped tubular rubber member 150.

Figure 14:
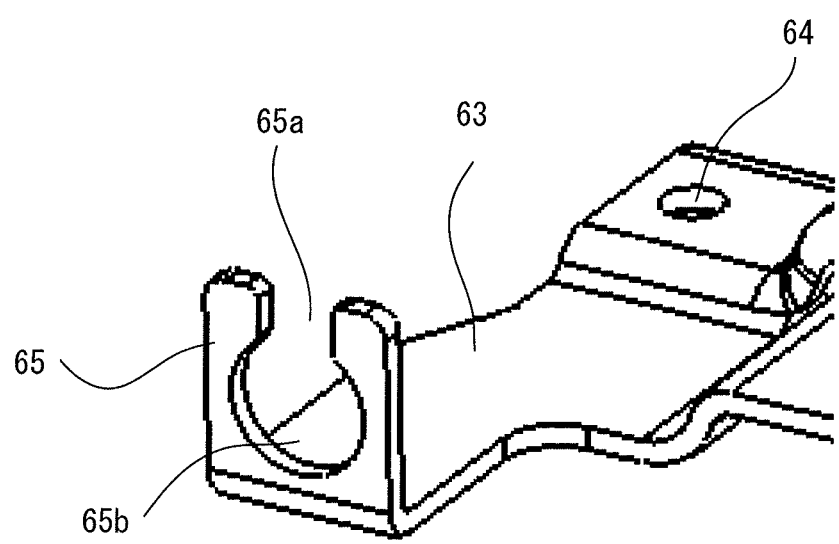
FIG. 14 is an enlarged perspective view of a portion of a module base (bracket) by which the battery module is fixed to the vehicle.

FIG. 14 is a perspective view of the bracket 63. A standing up portion 65 is formed at one end portion of this bracket 63. This standing up portion 65 is formed with a notch 65a cut out of its upper portion and an opening portion 65b that communicates with the notch 65a. When the small diameter portion 154 of the letter-L shaped tubular rubber member 150 is pressed against the notch 65a from above, this small diameter portion 154 of the letter-L shaped tubular rubber member 150 fits into the opening portion 65b. Since the external diameter of the small diameter portion 154 of the letter-L shaped tubular rubber member 150 is larger than the opening of the notch portion 65a, accordingly the small diameter portion 154 of the letter-L shaped tubular rubber member 150 can only pass through the notch 65a in its state in which it has been compressed by the notch portion 65a, and then it fits into the opening portion 65b and passes through it.

FIG. 13 shows the state in which the letter-L shaped tubular rubber member 150 is reliably held by the bracket 63. And FIG. 15 is a sectional view taken along lines XV-XV in FIG. 13.

Figure 15:
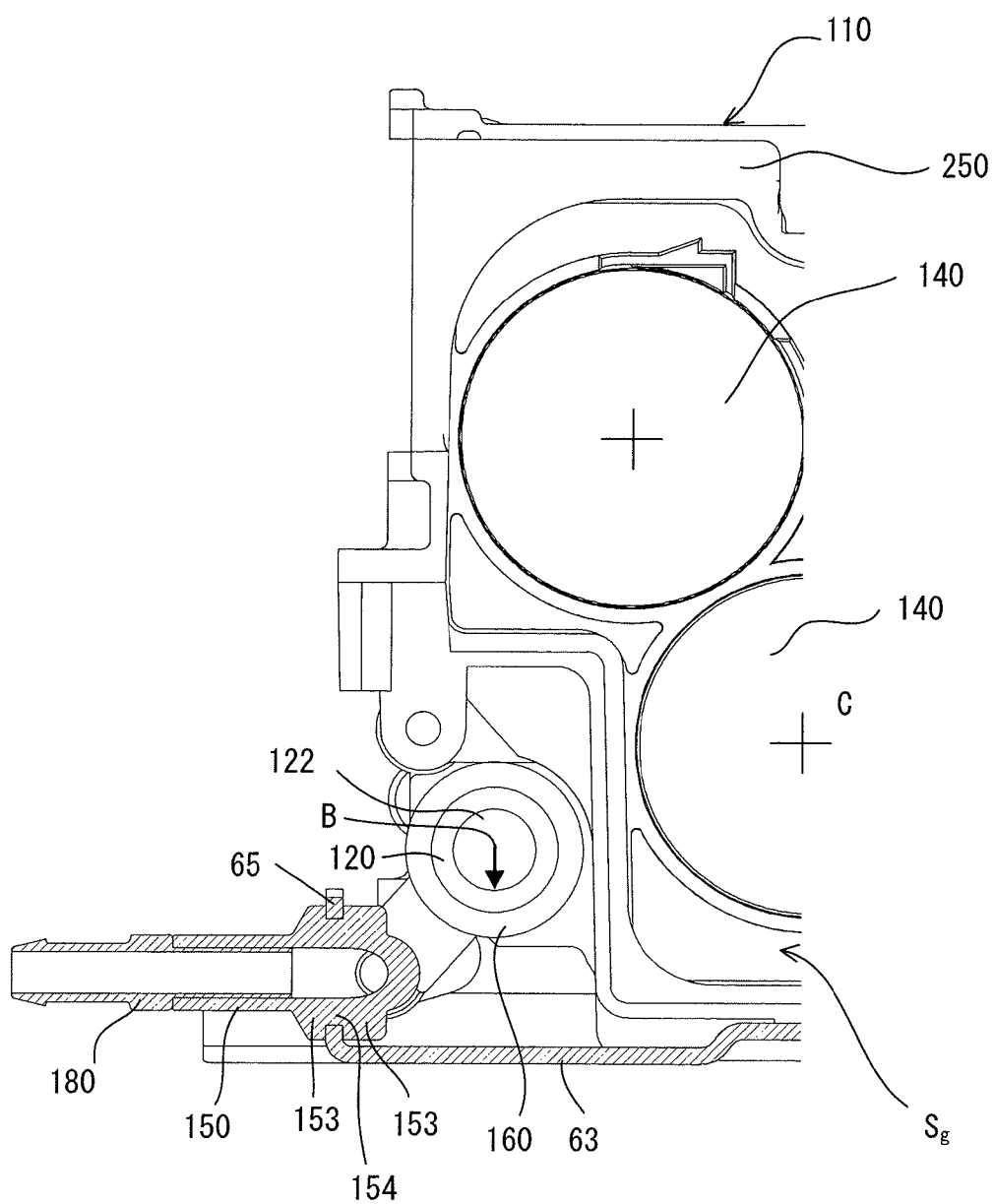
FIG. 15 is a sectional view taken along lines XV-XV in FIG. 13.

As shown in FIG. 15, the small diameter portion 154 of the letter-L shaped tubular rubber member 150, that is positioned between its two large diameter portions 153, is fitted into the standing up portion 65 of the bracket 63. In this case, the portions of the letter-L shaped tubular rubber member 150 near the two large diameter portions 153 are thicker than its end portion and have high rigidity. Due to this, the letter-L shaped tubular rubber member 150 is reliably fixed to the bracket 63.

Figure 16:
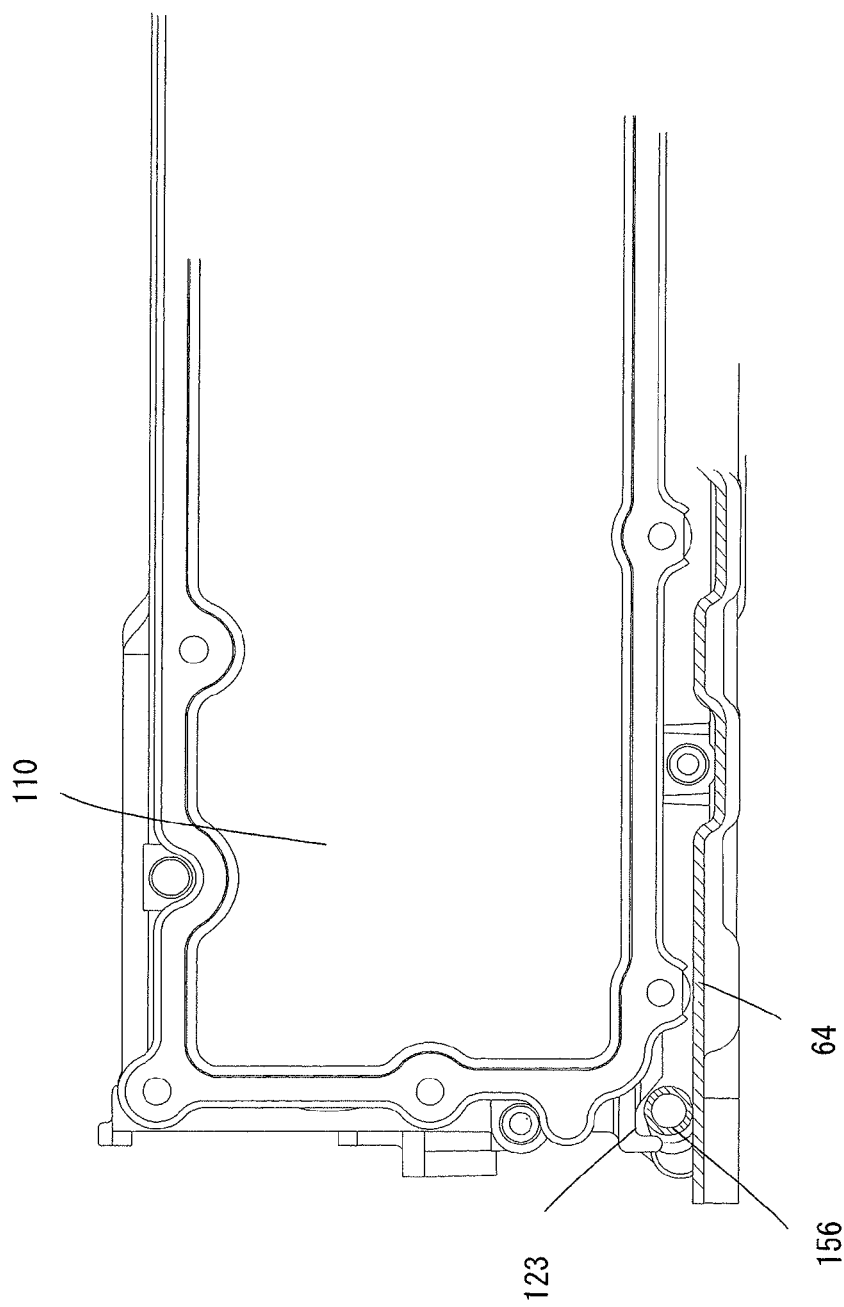
FIG. 16 is a sectional view taken along lines XVI-XVI in FIG. 7.

FIG. 16 is a sectional view taken along lines XVI-XVI in FIG. 7.

As shown in FIGS. 7 and 16, letter-L shaped engagement portions 123 are formed unitarily with the lower portions of the side plates 250 and 251, and project within the recessed portions 110A. The outer circumference of the linking tubular rubber member 156 that connects together the letter-L shaped coupling 190 and the letter-T shaped coupling 170 is pressed by the bracket 64 and by the letter-L shaped engagement portions 123 (see FIG. 13) that are provided on the side plates 250 and 251. Due to this, the linking tubular rubber member 156 does not move and is not interfered with by any other members. Moreover, even when this electricity storage device 1000 is fitted to a vehicle, the linking tubular rubber member 156 does not cause any impediment to the task of engaging the engagement members.

In FIGS. 7 and 13, for the sake of clarity of explanation, the battery module on the left side in the figures is denoted by 100L, while the battery module on the right side is denoted by 100R. Moreover, the tubular rubber member 160 that is connected to the battery module 100L is denoted by 160L, while the tubular rubber member 160 that is connected to the battery module 100R is denoted by 160R.

As shown in FIGS. 7 and 13, the tubular rubber member 160L is connected to the projecting portions 120 and 121 of the battery module 100L. In a similar manner, the tubular rubber member 160R is connected to the projecting portions 120 and 121 of the battery module 100R. The letter-L shaped coupling 190 is connected to the tubular rubber member 160L. And the letter-T shaped coupling 170 is connected to the tubular rubber member 160R. The end portion of the letter-L shaped coupling 190 and one end of the letter-T shaped coupling 170 are connected together by the linking tubular rubber member 156. And the letter-L shaped tubular rubber member 150 is connected to the other end of the letter-T shaped coupling 170. Moreover, the straight type coupling 180 is connected to the letter-L shaped tubular rubber member 150.

There are following three methods for fitting this gas discharge device 70.

(1) After having assembled the gas discharge device 70 in advance, the tubular rubber member 160L is connected to the projecting portions 120 and 121 of the battery module 100L, and then the tubular rubber member 160R is connected to the projecting portions 120 and 121 of the battery module 1OOR.

(2) The tubular rubber member 160L is connected to the projecting portions 120 and 121 of the battery module 100L, and the tubular rubber member 160R is connected to the projecting portions 120 and 121 of the battery module 100R. Next, the letter-L shaped coupling 190 is connected to the tubular rubber member 160L, and the letter-T shaped coupling 170 is connected to the tubular rubber member 160R. The linking tubular rubber member 156 is connected to the letter-L shaped coupling 190 and to the letter-T shaped coupling 170, and the letter-L shaped tubular rubber member 150 and the straight type coupling 180 are connected to the letter-T shaped coupling 170 in that order, or the letter-L shaped tubular rubber member 150, to which the straight type coupling 180 has been connected in advance, is connected to the coupling 170.

(3) The tubular rubber member 160L is connected to the projecting portions 120 and 121 of the battery module 100L, and the tubular rubber member 160R is connected to the projecting portions 120 and 121 of the battery module 100R. The letter-L shaped coupling 190 and the letter-T shaped coupling 170 are connected to the linking tubular rubber member 156. The letter-L shaped tubular rubber member 190 is connected to the tubular rubber member 160L, and the letter-T shaped coupling 170 is connected to the tubular rubber member 160R. Subsequently the letter-L shaped tubular rubber member 150 is connected to the letter-T shaped coupling 170, and then is connected to the straight type coupling 180 in that order; or, alternatively, the letter-L shaped tubular rubber member 150, to which the straight type coupling 180 has been connected in advance, is connected to the letter-T shaped coupling 170.

Any of the methods (1) through (3) described above would be acceptable. Moreover, in the method (2) or (3) described above, it would also be acceptable to grip the letter-L shaped tubular rubber member 190, or the combination of the letter-L shaped tubular rubber member 150 and the straight type coupling 180, in the bracket 63 before fitting of the tubular rubber member 160, or before fitting of the letter-L shaped coupling 190 and the letter-T shaped coupling 170. Since it is necessary to sandwich the linking tubular rubber member 156 between the letter-L shaped engagement portion 123 and the bracket 62, accordingly it would be acceptable, when the letter-L shaped tubular rubber member 150 is fit to the bracket 62, this letter-L shaped tubular rubber member 150 may be fit it in advance in the state in which this member is not connected to the letter-T shaped coupling 170.

In FIG. 15, the reference symbol C denotes the axis of one of the battery cells 140 that are received in the storage chamber of the case member 110. As shown in this FIG. 15, the lowermost surface portion B of the through-hole 122 of the projecting portion 120 (121) formed in the side plate 250 (251) is positioned lower than the axis C of this battery cell 140 that is arranged in the lower portion of the storage chamber of the case member 110. Due to this, any gas including liquid in mist form that has spurted into the gas discharge space Sg from the battery cells 140 is discharged by its own weight into the through-hole 122 of the projecting portion 120 (121).

This gas including liquid in mist form that has been discharged into the through-hole 122 of the projecting portion 120 (121) is further discharged via the letter-L shaped coupling 190, the linking tubular rubber member 156, the letter-T shaped coupling 150, the letter-L shaped tubular rubber member 150, and the straight type coupling 180.

Figure 17:
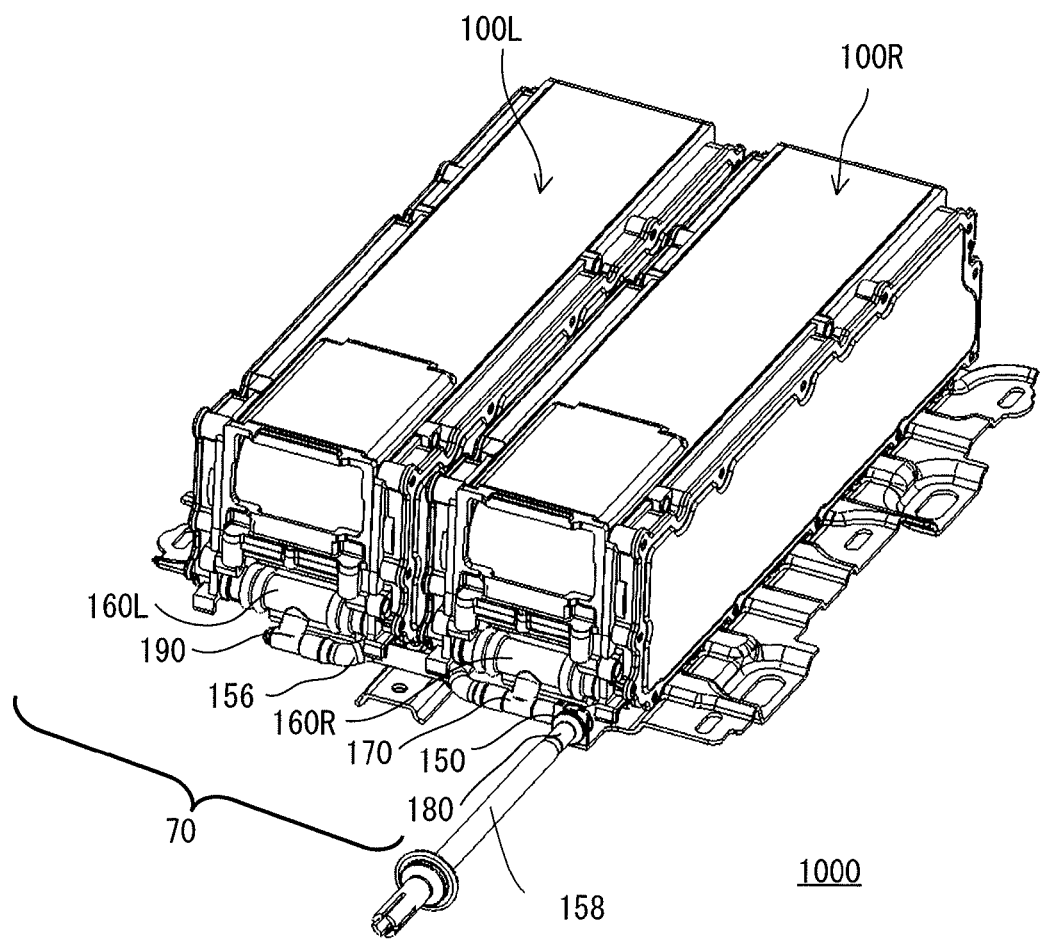
FIG. 17 is an external perspective view showing the electricity storage device of the present invention in its state in which a tube for venting gas to the exterior of the vehicle is installed.

FIG. 17 is an external perspective view showing a state in which a discharge tube 158 for discharge to the exterior of the vehicle has been connected to the straight type coupling 180. From the straight type coupling 180, the gas including liquid in mist form further flows through this discharge tube 158 and is discharged to the exterior of the vehicle.

In this first embodiment, the side plates 250 and 251 and the cover members 260 and 261 are fitted to the sides of the case member 110 in which the positive terminals 111 and the negative terminals 112 of the plurality of battery cells 140 are arranged, so that the gas discharge spaces Sg, into which gas including liquid in mist form that is spurted out from the battery cells 140 is discharged, are defined between the side plates 250 and 251 and the cover members 260 and 261 respectively. Due to this, it becomes unnecessary to make, for each battery cell 140, a safety valve having an conically shaped construction fitted into a tubular rubber member, so that it becomes simple to connect the plurality of battery cells and the gas discharge spaces, and it is possible to enhance the ease of working. Moreover, since the projecting portions 120 and 121 are provided to the side plates 250 and 251, and it is arranged for the lowermost surface portions B of the through-holes 122 in these projecting portions 120 and 121 to be lower than the axes C of the battery cells 140 that are arranged lowermost in the case member, accordingly the gas including liquid in mist form can be discharged smoothly from the gas discharge spaces Sg into the through-holes 122 of the projecting portions 120 and 121, and it is possible to prevent this gas from stagnating upon the gas discharge path.

Embodiment 2

Figure 20:
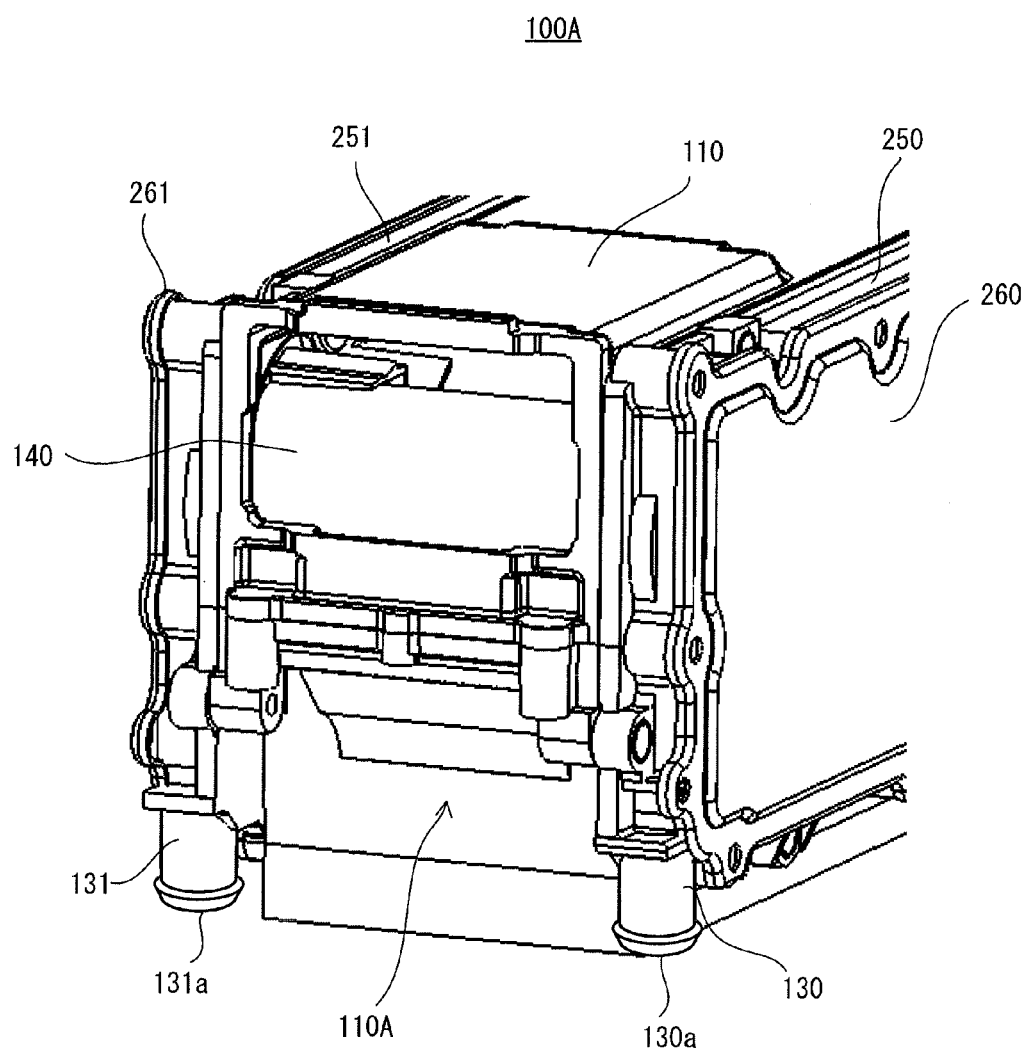
FIG. 20 is an external perspective view, showing a second embodiment of the battery module of the present invention.

FIG. 20 is an external perspective view, showing a second embodiment of the battery module of the present invention.

The feature by which the battery module 100A of the second embodiment differs from the battery module 100 of the first embodiment, is that projecting portions 130 and 131 that are respectively formed upon the side plates 250 and 251 protrude in the vertical direction, and their tip end surfaces are oriented downwards. These projecting portions 130 and 131 are formed so as to provide through-holes (not shown in the drawing) in portions of the wall portions on the lower sides of the side plates 250 and 251 respectively. These through-holes, that are communication openings communicating with the gas discharge spaces Sg defined by the side plates 250 and 251 and the cover members 260 and 261, are positioned in the lower portions of the gas discharge spaces Sg. And these communication openings provided by the through-holes in the projecting portions 130 and 131 that communicate with the gas discharge spaces Sg are positioned lower than the axes C of the battery cells 140 that are arranged on the lower side.

The end portions of these projecting portions 130 and 131 have conically shaped portions 130a and 131a respectively, to which an letter-T shaped tubular rubber member (not shown) that has, for example, a structure of end portion similar to the one of the tubular rubber element 160 at its both end portions and that these end portions are bent perpendicular with respect to the horizontal hollow tubular portion 161 on the bellow portion 163 in the plane of the FIG. 6 is fitted over each of these conically shaped portions 130a and 131a. Each of the projecting portions 130 and 131 has a hollow cylindrical shape. The conically shaped portions 130a and 131a, whose cross sections are formed with right angled triangles, are formed on the respective tip end portions of the projecting portions 130 and 131 (i.e. on their tip end portions remote from the side plates 250 and 251) around their entire external peripheries. At the both end portions of this letter-T shaped tubular rubber member (not shown), its internal diameters of the tip end portions are, similar to the end portions 164 of the tubular rubber members 160, set to be smaller than the diameters of the maximum diameter portions of the conically shaped portions 130a and 131a. Since the internal diameters of the tip end portions of this letter-T shaped tubular rubber member are, similar to the end portions 164 of the tubular rubber members 160, smaller in size than the diameters of the maximum diameter portions of the conically shaped portions 130a and 131a, and moreover since they are made to be thick, accordingly, by fitting the end portions of this letter-T shaped tubular rubber member over the maximum diameter portions of the conically shaped portions 130a and 131a as far as possible, the fitting becomes reliable, and they cannot easily come off.

The above letter-T shaped tubular rubber member are, similar to the tubular rubber members 160, also disposed within the recessed portion 110A of the case member 110. When manufacturing an electricity storage device using this battery module 100A, in a similar manner to the case with the first embodiment, the gas discharge device may be built up by connecting the letter-L shaped coupling 190, the letter-T shaped coupling 150, and the linking tubular rubber member 156 to the projecting portions 130 and 131, and furthermore by connecting the letter-L shaped tubular rubber member 150 and the straight type coupling 180 and so on, according to requirements. It should be understood that, if it is possible to prevent the above described letter-T shaped tubular rubber member (not shown) from coming off from the projecting portions 130 and 131 by some other method, then it would also be acceptable to arrange to form the external peripheral shapes of the projecting portions 130 and 131 in tapered shapes, as shown for the first embodiment.

The other constructional elements are the same as in the first embodiment, and accordingly, in the drawing, the same reference symbols are appended to corresponding members, and description thereof is omitted.

In this second embodiment as well, gas discharge spaces Sg into which gas including liquid in mist form is discharged are defined by the side plates 250 and 251 and the cover members 260 and 261 at the sides of the case member 110 in which the battery cells 140 are stored. And the communication openings that communicate the through-holes of the respective projecting portions 130 and 131 of the side plates 250 and 251 with the gas discharge spaces Sg are both positioned lower than the axes C of the battery cells 140 that are arranged in the lower layer. Due to this, the same beneficial effects are obtained as in the case of the first embodiment. Moreover, with this second embodiment, the communication openings formed by the through-holes in the projecting portions 130 and 131 that communicate with the gas discharge spaces Sg defined by the side plates 250 and 251 and the cover members 260 and 261 are positioned at the lower portions of those gas discharge spaces Sg, and moreover are oriented downwards. Due to this, it is possible for gas including liquid in mist form that is discharged into the gas discharge spaces Sg to be discharged smoothly into the through-holes in the projecting portions 130 and 131, and it is possible to prevent this gas stagnating upon the gas discharge path.

Embodiment 3

Figure 21:
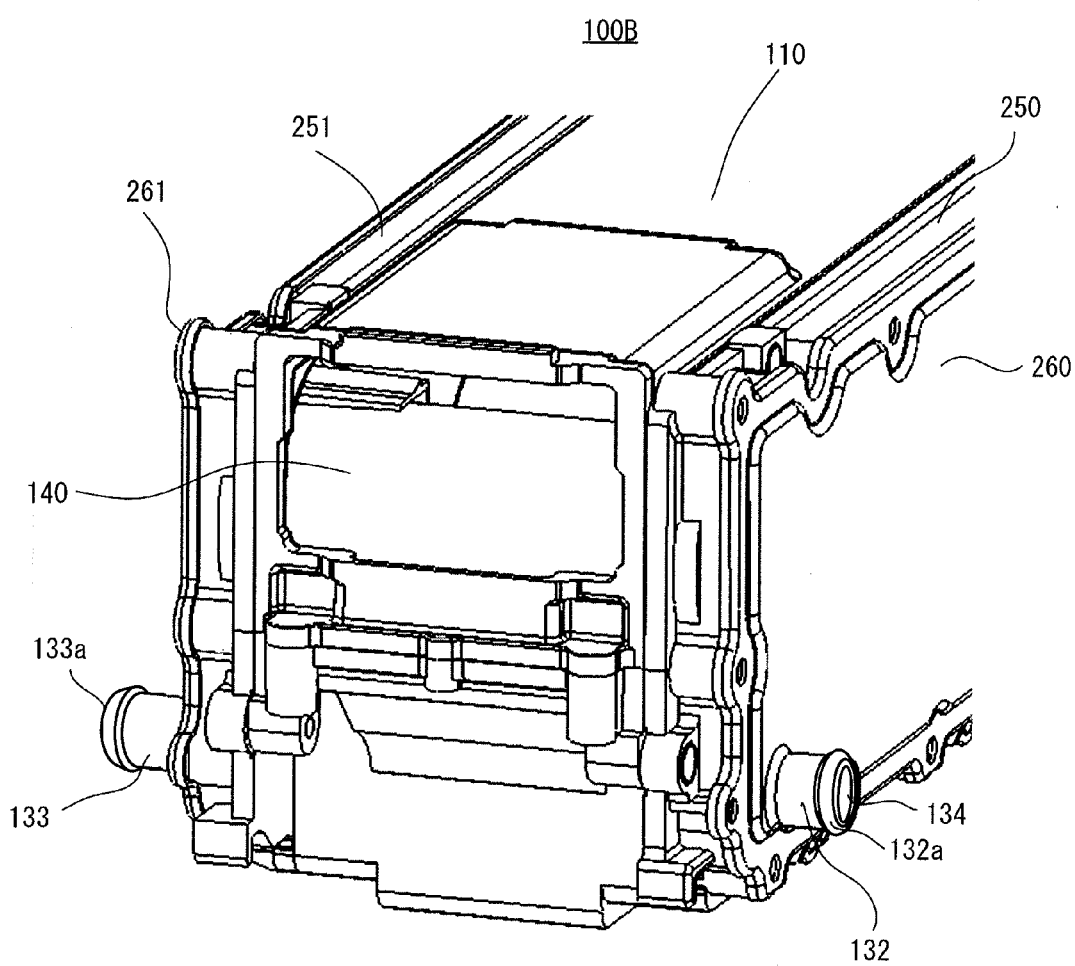
FIG. 21 is an external perspective view, showing a third embodiment of the battery module of the present invention.

FIG. 21 is an external perspective view, showing a third embodiment of the battery module of the present invention.

The feature by which the battery module 100B of the second embodiment differs from the battery modules 100 and 100A of the first and second embodiments, is that projecting portions 132 and 1333 are not formed integrally with the side plates 250 and 251, but are attached to other members.

In other words, the projecting portions 132 and 133 of this third embodiment are formed on the lower portions of the cover members 260 and 261 respectively, so as to project at right angles to their outer surfaces. Each of these projecting portions 132 and 133 has a through-holes 134 that communicates with the corresponding gas discharge space Sg. Such structures can be made, for example, by forming opening portions in the outer surfaces of the cover members 260 and 261, which are, in the state in which the through-holes 134 of the projecting portions 132 and 133, positioned against these opening portions, and are fixed to the cover members 260 and 261 respectively by welding or the like. If the projecting portions 132 and 133 are to be fixed to the cover members 260 and 261 respectively by welding, then it is desirable for the material from which the projecting portions 132 and 133 are made to be the same as that of the cover members 260 and 261. The communication openings that communicate with the gas discharge spaces Sg, and that are defined by the through-holes 134 in the projecting portions 132 and 133 and the side plates 250 and 251 and the cover members 260 and 261, are both positioned in the lower portions of the corresponding gas discharge spaces Sg. And the lowermost portions of the surfaces of these communication openings via which the through-holes in the projecting portions 132 and 133 communicate with the gas discharge spaces Sg are positioned lower than the axes C of the battery cells 140 that are arranged in the lower layer.

The end portions of the projecting portions 132 and 133 are both provided with respective conically shaped portions 132a and 133a, and, in a similar manner to the case with the first embodiment, a tubular rubber element (not shown) having similar structures of the end portions of tubular rubber members 160 is fitted over each of these conically shaped portions 132a and 133a. When manufacturing an electricity storage device using this battery module 100B, the gas discharge device may be built up by connecting the letter-L shaped coupling 190, the letter-T shaped coupling 150, and the linking tubular rubber member 156 to these tubular rubber members (not shown), and furthermore by connecting the letter-L shaped tubular rubber member 150 and the straight type coupling 180 and so on, according to requirements.

It should be understood that, if it is possible to prevent the above mentioned tubular rubber members (not shown) from coming off from the projecting portions 132 and 133 by some other method, then it would also be acceptable to arrange to form the external shapes of the projecting portions 132 and 133 as tapered shapes, as shown in the first embodiment.

The other constructional elements are the same as in the first embodiment, and accordingly, in the drawing, the same reference symbols are appended to corresponding members, and description thereof is omitted.

In this third embodiment as well, the gas discharge spaces Sg into which gas including liquid in mist form is discharged are defined by the side plates 250 and 251 and the cover members 260 and 261 in the side surfaces of the case member 110 in which the battery cells 140 are stored. Moreover, the projecting portions 132 and 133 that communicate with the gas discharge spaces Sg are attached to the cover members 260 and 261, and the lowermost portions of the surfaces of the through-holes 134 of the projecting portions 132 and 133 are positioned lower than the axes C of the battery cells 140 that are arranged in the lower layer. Due to this, the same beneficial effects are obtained as in the case of the first embodiment.

According to the battery module 100 and the electricity storage device 1000 of the various embodiments of the present invention as explained above, it is possible to obtain the following beneficial effects.

(1) The side plates 250 and 251 and the cover members 260 and 261 are attached to the sides of the case member 110 in which the positive terminals 111 and the negative terminals 112 of the plurality of battery cells 140 are arranged, and the gas discharge spaces Sg into which gas including liquid in mist form that has spurted out from the battery cells 140 is discharged are defined between the side plates 250 and 251 and the cover members 260 and 261. Due to this, it is not necessary to form a safety valve for each of the battery cells 140 having an conically shaped construction and to fit a tubular rubber member over it, so that it becomes simple and easy to perform connection between the plurality of battery cells and the gas discharge spaces, and accordingly it is possible to enhance the convenience of working.

(2) A construction is adopted in which the projecting portions 120 and 121 (in the first embodiment) or 130 and 131 (in the second embodiment) are provided to the side plates 250 and 251, and the lowermost portions B of the surfaces of the through-holes 122 in the projecting portions 120 and 121 are lower than the axes C of the battery cells 140 that are arranged lowermost in the case member. Or the projecting portions 132 and 133 are provided to the cover members 260 and 261 respectively, and the through-holes 134 that communicate with the gas discharge spaces Sg are provided to the projecting portions 132 and 133, with the lowermost surfaces of the communicating openings of these through-holes 134 being lower than the axes C of the battery cells 140 that are arranged lowermost in the case member (in the third embodiment).

Due to these constructions, in both cases, it is ensured that the gas including liquid in mist form that has been discharged into the gas discharge spaces Sg does not stagnate upon the gas discharge path.

(3) The battery module 100 is provided with the plurality of battery cells 140, the case member 110 in which the plurality of battery cells 140 are housed, and the plurality of electrically conductive members 115 for electrically connecting together the plurality of battery cells 140. And the plurality of electrically conductive members 115 for electrically connecting together the plurality of battery cells 140 are fitted to the side plates 250 and 251 from the exterior of the case member 110. Due to this, it is possible simply and easily to establish the connections between the electrically conductive members 115 and the battery cells 140.

(4) The through-holes 201 are formed in the side plates 250 and 251 and are positioned to correspond to the plurality of battery cells 140, and moreover the annular grooves 205a and 206a are formed in the side plates 250 and 251 for ensuring the thickness of the adhesive masses 220 and 221 that adhere the battery cells 140 to the side plates 250 and 251. And the plurality of battery cells 140 are fitted to the side plates 250 and 251 by using the adhesive masses 220 and 221, so as closely to block up the through-holes 201. Due to this, it is possible reliably to separate the space internal to the case member 110 and the spaces external to it, so that the reliability is enhanced. Moreover, it is possible to maintain the connection state between the side plates 250 and 251 and the battery cells 140 while external force that is applied to the battery module 100, for example vibration or the like, is being absorbed by the elasticity of the side plates 250 and 251 that are firmly adhered the battery cells with adhesive.

(5) The positions in the longitudinal direction of the battery cells 140 that are arranged along the lower layer are displaced by half a pitch with respect to the battery cells that are arranged along the upper layer, and the recessed portions 110A are provided in the side plates 250 and 251 and the cover members 260 and 261. And the projecting portions 120 and 121 and the gas discharge device 70 are provided within these recessed portions 110A. Due to this, it is possible to make the battery module 100 more compact. Moreover, when the battery module 100 or the electricity storage device 1000 is to be fitted to a vehicle, it is possible to ensure that the gas discharge device 70 is prevented from impeding the task of fitting.

(6) Since it is arranged for the tubular rubber member 160 to be fitted over the projecting portions 120 and 121 that mutually confront one another, accordingly it is possible to prevent the tubular rubber member 160 from coming off from these projecting portions 120 and 121 due to the pressure of gas discharge. Moreover, since the tubular rubber member 160 extends in the short direction that is orthogonal to the longitudinal direction along which the battery cells 140 are arranged, accordingly its total length becomes short, and it is possible to prevent it from becoming any impediment to the task of assembly, or from coming off after assembly due to being bumped by the hand of some person. Furthermore, since the conically shaped portions 130a and 131a are provided to the projecting portions 130 and 131 respectively (in the second embodiment) or the conically shaped portions 132a and 133a are provided to the projecting portions 132 and 133 respectively (in the third embodiment), accordingly it is possible to prevent the tubular rubber members (of different shape from the tubular rubber member 160) from coming off from the projecting portions 130 and 131 (in the second embodiment), or from the projecting portions 132 and 133 (in the third embodiment), due to the pressure of gas discharge.

(7) Since the internal diameters of the tip end portions 164 of the tubular rubber members 160 are larger than the external diameters of the tip end portions of the end portions of the projecting portions 120 and 121 remote from the side plates 250 and 251, accordingly it is simple and easy to fit the tip end portions 164 of the tubular rubber members 160 over the end portions of the projecting portions 120 and 121 remote from the side plates 250 and 251. Moreover, since the internal diameters of the tip end portions 164 of the tubular rubber members 160 are smaller than the external diameters of the projecting portions 120 and 121 from positions partway along them to the side plates 250 and 251, and since moreover they are formed quite thick, accordingly, due to the tip end portions of the tubular rubber members 160 being fitted over the projecting portions 120 and 121 and pushed far therealong (all the way to the neighborhood of the side plates 250 and 251 respectively), the fitting of the tubular rubber members 160 becomes secure, and they cannot easily come off.

(8) Since the bellows portions 163 are provided to both the ends of the tubular rubber member 160, accordingly it is possible to absorb variation of the distance between the projecting portions 120 and 121 by extension and retraction of these bellows portions 163, so that the task of fitting is simple and easy.

(9) Since the end portion of the pipe shaped couplings that are incorporated in the gas discharge device 70 have conical forms that become progressively larger in diameter from their ends and whose maximum diameters are greater than the diameters of the opening portions of the tubular rubber members, accordingly the fitting of the tubular rubber members 160 becomes simple and easy, and moreover it is difficult for them to come off.

(10) The letter-L shaped tubular rubber member 160 is provided with the two large diameter portions 153 that have high rigidity, and with the small diameter portion 154, and the small diameter portion 154 is fitted into the standing up portion 65 of the bracket 63. Due to this, the letter-L shaped tubular rubber member 150 is reliably fixed to the bracket 63.

(11) The letter-L shaped engagement portions 123 that press the linking tubular rubber member 156 against the bracket 64 are both formed integrally with the side plates 250 and 251. Due to this, even when the linking tubular rubber member 156 moves, it is ensured that it does not interfere with any other member. Moreover, even when this electricity storage device 1000 is to be fitted to a vehicle, it is ensured that the linking tubular rubber member 156 does not constitute any impediment to the task of engagement of any engaging member.

In the embodiments explained above, examples were disclosed in which two battery modules 100a and 100b were used, each of them incorporating a plurality of battery cells 140 connected in series. However, the present invention is not to be considered as being limited with regard to the structures of the battery modules 100a and 100b described above, or with regard to the manner in which they are connected (series or parallel); it would also be possible to apply the present invention to structures in which the number of the battery cells 140, the number of layers of the battery cells 140, or their directions of arrangement are varied.

While, in the embodiments explained above, examples were disclosed of cases in which two layers of battery cells were superimposed over one another along the height direction of the storage chamber of the case member 110, it would also be acceptable for the battery cells 140 to be provided in only one layer, or for three or more layers of battery cells 140 to be superimposed over one another. If three or more layers are superimposed, and if the battery cells 140 that are arranged in each layer are displaced in the longitudinal direction by half a pitch with respect to the battery cells 140 in the layer above (if any) and in the layer below (if any), then it is possible to reduce the height of the case member 110.

While, in the embodiments explained above, examples were disclosed of cases in which the battery cells 140 that were arranged in each layer were, along their axial direction, arranged in only one layer, it would also be acceptable to arrange for several of these battery cells 140 to be arranged in series along their axial direction. In this case, if a construction is adopted in which the positive electrode and the negative electrode of two battery cells 140 that are to be connected in series along their axial direction are directly connected together, for example by welding or the like, then the connection construction becomes simple.

In the embodiments explained above, examples were disclosed of cases in which the electricity storage device 1000 was formed by combining two of the battery modules 100. However, the electricity storage device 1000 may be formed by combining three or more of the battery modules 100. In this case, it is desirable for the electricity storage device 1000 to be constructed to have a gas discharge device 70 that is connected by tubular rubber members 160 to the gas discharge spaces Sg that are defined on both sides of the case member 110 for the respective battery modules 100, and for the tubular rubber members 160 to be connected together by couplings and linking tubular rubber members. The reasons are that the lengths of the tubular rubber members become short, the amplitudes of their movements due to vibration become low, the task of assembly becomes easy, and moreover it is difficult for the tubular rubber members to come off after having been fitted.

Examples have been disclosed in which the gas discharge device 70 explained in the above description includes the tubular rubber members 160, the letter-L shaped coupling 190, the letter-T shaped coupling 170, the linking tubular rubber member 156, the letter-L shaped tubular rubber member 150, and the straight type coupling 180. However, the numbers of couplings and tubular rubber members in the structure of the gas discharge device 70 and their shapes may be freely varied in various ways. Furthermore, the tubular rubber members are not limited to being made of a rubber material, since a so called elastomer material may be used; and, generally, any hollow tubular members may be used that have suitable flexibility.

While, in the embodiments explained above, examples were disclosed of cases in which the battery cells 140 were cylindrical cells, the present invention is not to be considered as being limited thereby. For example, the present invention could also be applied to a case in which the shape of the battery cells 140 is square, or to a case of the battery cells sealed in aluminum laminate; and moreover, apart from lithium ion cells, the present invention could also be applied to other types of cells, such as nickel-hydrogen cells or the like.

The electricity storage device 1000 according to the embodiments explained above may also be applied as a power supply device for some other type of electrically operated vehicle, for example such as a railroad vehicle like a hybrid train, a public transport vehicle such as a bus or the like, a cargo vehicle such as a truck or the like, or an industrial vehicle such as a battery type fork lift truck or the like.

Furthermore, the electricity storage device 1000 according to an embodiment of the present invention may also be applied to an electricity storage device that constitutes a power supply device for some application other than an electrically powered vehicle, such as an uninterruptible power supply device that is used for a computer system or a server system or the like, or a power supply device that is used in an electricity generation facility for home use or the like.

Apart from the above, the battery module of the present invention may be constructed in various altered ways, within the range of the gist of the present invention. It will suffice if it includes: a case member having a storage section in which a plurality of battery cells each having a positive electrode terminal and a negative electrode terminal are arranged along a longitudinal direction in at least one layer with their axes parallel, and made so that its one side and its other side facing the terminals of the plurality of battery cells are open surfaces opened to the exterior; a first side plate that covers an open surface on the one side of the case member, and that has a plurality of opening portions that expose the terminals of the plurality of battery cells on the one side of the case member; a second side plate that covers an open surface on the other side of the case member, and that has a plurality of opening portions that expose the terminals of the plurality of battery cells on the other side of the case member; a first cover member that covers the first side plate and defines a first gas discharge space between itself and the first side plate, into which gas flows out from the terminals of the plurality of battery cells on the one side of the case member; a second cover member that covers the second side plate and defines a second gas discharge space between itself and the second side plate, into which gas flows out from the terminals of the battery cells on the other side of the case member; a first guide portion having a through-hole communicating with the first gas discharge space; a second guide portion having a through-hole that communicating with the second gas discharge space; and a guide portion communication member including a flexible member that connects the first guide portion and the second guide portion; with each of the through-hole communicating with the first gas discharge space and the through-hole communicating with the second gas discharge space have respectively a lowermost surface that is positioned lower than a axe of any of the plurality of battery cells that are arranged in the case member.

Furthermore, it will be sufficient if the electricity storage device of the present invention incorporates a first battery module constituted by a battery module as described above, a second battery module constituted by a battery module as described above, and an external communication member that communicates with a guide portion communication member of the first battery module and a guide portion communication member of the second battery module.

As explained above, according to the present invention, by being stored in the storage section of the case member, each of the battery cells is communicated with the gas discharge spaces that are defined by the side plates and the cover members, so that gas that is spurted from each of the battery cells is discharged via the gas discharge spaces into the guide portions and the guide portion communication member, accordingly the connection between the plurality of battery cells and the gas discharge spaces becomes simple, so that it is possible to enhance the convenience for production. Moreover, since the communication openings of the guide portions that communicate with the gas discharge space have lowermost surfaces that are positioned lower than the axes of the positive electrodes and the negative electrodes of the battery cells, accordingly the discharge of gas becomes smooth.

What is claimed is:
1. A battery module, comprising:
a case member having a storage section in which a plurality of battery cells each having a positive electrode terminal and a negative electrode terminal are arranged along a longitudinal direction in at least one layer with their axes parallel, and made so that its one side and its other side facing surfaces of the terminals of the plurality of battery cells in a direction of the axes are open surfaces opened to the exterior;
a first side plate that covers an open surface on one side of the case member, and that has a plurality of opening portions that expose surfaces of the terminals of the plurality of battery cells in the direction of the axes on the one side of the case member;

a second side plate that covers an open surface on the other side of the case member, and that has a plurality of opening portions that expose the surfaces of the terminals of the plurality of battery cells in the direction of the axes on the other side of the case member;

a first cover member that covers the first side plate and defines a first gas discharge space between itself and the first side plate, into which gas spurted in a direction in which the respective axes of the battery cells extend flows out from the surfaces of the terminals of the plurality of battery cells in the direction of the axes on the one side of the case member via the opening portions of the first side plate;

a second cover member that covers the second side plate and defines a second gas discharge space between itself and the second side plate, into which gas spurted in a direction in which the respective axes of the battery cells extend flows out from the surfaces of the terminals of the plurality of battery cells on the other side of the case member via the opening portion of the second side plate;

a first guide portion having a through-hole communicating with the first gas discharge space;

a second guide portion having a through-hole communicating with the second gas discharge space; and a guide portion communication member including a flexible member that connects the first guide portion and the second guide portion;

and wherein the through-hole communicating with the first gas discharge space and the through-hole communicating with the second gas discharge space have respectively a lowermost surface that is positioned lower than an axis of any of the plurality of battery cells that are arranged in the case member.

2. A battery module according to claim 1, wherein the first guide portion protrudes from the first side plate towards the second side plate, and the second guide portion protrudes from the second side plate towards the first side plate; both the first guide portion and the second guide portion have hollow cylinder shapes.

3. A battery module according to claim 1, wherein: the plurality of battery cells that are arranged in a longitudinal direction in the storage section of the case member are arranged in several layers; a lowermost plurality of battery cells that are arranged in a lowermost layer are displaced along the longitudinal direction by half of a distance between central axes of a plurality of battery cells that are arranged adjacent to one another in a layer directly above the lowermost layer; correspondingly, one end portion of the lowermost plurality of battery cells is positioned at a recessed position to interior space relative to one end portion of the plurality of battery cells that are arranged in the layer directly above the lowermost layer; the case member has a recessed portion corresponding to the recessed position of the lowermost plurality of battery cells; and the first guide portion, the second guide portion and the guide portion communication member are arranged in the recessed portion.

4. A battery module according to claim 1, wherein the first guide portion and the second guide portion have tapered tip end portions.

5. A battery module according to claim 1, wherein the guide portion communication member includes a tubular rubber member that communicates with the first guide portion and the second guide portion.

6. A battery module according to claim 5, wherein the tubular rubber member has bellows portions at both its end portions.

7. A battery module according to claim 5, wherein the tubular rubber member has an opening portion between the bellows portions at both end portions of the tubular rubber member, and the guide portion communication member includes a pipe shaped coupling that is fitted into the opening portion of the tubular rubber member.

8. A battery module according to claim 7, wherein the guide portion communication member has an L-shaped tubular rubber member that is connected to the coupling, and the an L-shaped tubular rubber member has a large diameter portion having high rigidity and a small diameter portion.

9. A battery module according to claim 1, wherein the first guide portion and the second guide portion are formed integrally with the first side plate and the second side plate respectively.

10. A battery module according to claim 1, wherein the first side plate and the second side plate have engagement portions that engage the guide portion communication member.

* * * * *